United States Patent
Chandran et al.

(10) Patent No.: US 10,717,102 B2
(45) Date of Patent: Jul. 21, 2020

(54) PRESSURE-BASED METHOD AND SYSTEM FOR MEASURING THE DENSITY AND HEIGHT OF A FLUIDIZED BED

(71) Applicant: ThermoChem Recovery International, Inc., Baltimore, MD (US)

(72) Inventors: Ravi Chandran, Ellicott City, MD (US); Dave G. Newport, Cumberland, ME (US); Daniel Michael Leo, Baltimore, MD (US); Daniel A. Burciaga, Manchester, MD (US); Justin Kevin Miller, Durham, NC (US); Kaitlin Emily Harrington, Hillsborough, NC (US); Brian Christopher Attwood, Cary, NC (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 15/609,769

(22) Filed: May 31, 2017

(65) Prior Publication Data

US 2018/0345308 A1 Dec. 6, 2018

(51) Int. Cl.
| | |
|---|---|
| *B05B 15/555* | (2018.01) |
| *G01N 9/26* | (2006.01) |
| *G01F 23/14* | (2006.01) |
| *B08B 9/032* | (2006.01) |
| *G01F 23/00* | (2006.01) |
| *G01F 23/18* | (2006.01) |
| *B08B 9/00* | (2006.01) |
| *B05B 15/55* | (2018.01) |

(52) U.S. Cl.
CPC ........... *B05B 15/555* (2018.02); *B05B 15/55* (2018.02); *B08B 9/00* (2013.01); *B08B 9/0328* (2013.01); *G01F 23/0069* (2013.01); *G01F 23/14* (2013.01); *G01F 23/18* (2013.01); *G01N 9/26* (2013.01)

(58) Field of Classification Search
CPC ..... B08B 9/0328; B08B 9/00; G01F 23/0061; G01F 23/14; G01F 23/0069; G01F 23/18; B05B 15/555; B05B 15/55; G01N 9/26
See application file for complete search history.

(56) References Cited

U.S. PATENT DOCUMENTS

| | | | |
|---|---|---|---|
| 2,680,065 A | 6/1954 | Atwell | |
| 3,840,354 A | 10/1974 | Donath | |
| 3,844,733 A | 10/1974 | Donath | |
| 4,069,024 A | 1/1978 | Fernandes | |
| 4,105,545 A | 8/1978 | Muller et al. | |
| 4,219,402 A | 8/1980 | DeGeorge | |
| 4,279,710 A | 7/1981 | Coughlin | |
| 4,300,916 A | 11/1981 | Frewer et al. | |
| 4,421,523 A * | 12/1983 | Mehta | B01J 8/1809 34/364 |

(Continued)

*Primary Examiner* — Bryan Bui
(74) *Attorney, Agent, or Firm* — Womble Bond Dickinson (US) LLP

(57) ABSTRACT

A method for calculating the height and the density of a fluidized bed is described. In a first mode of operation, a first differential pressure and a second differential pressure are obtained, a bed density of the fluidized bed is calculated, and a bed height is calculated by dividing the first differential pressure by the calculated bed density. In a second mode of operation the system is purged by using a pressurized gas.

22 Claims, 11 Drawing Sheets

AUTOMATED LEVEL AND DENSITY MEASUREMENT SYSTEM (1000)
NORMAL MODE OF OPERATION (FIRST EMBODIMENT)

(56) References Cited

U.S. PATENT DOCUMENTS

| | | |
|---|---|---|
| 4,688,521 A | 8/1987 | Korenberg |
| 4,857,084 A | 8/1989 | Robbins et al. |
| 5,064,444 A | 11/1991 | Kubiak et al. |
| 5,125,965 A | 6/1992 | Sebenik |
| 5,439,491 A | 8/1995 | Kubiak et al. |
| 5,624,470 A | 4/1997 | Tanca |
| 5,635,147 A | 6/1997 | Herbert et al. |
| 5,667,560 A | 9/1997 | Dunne |
| 5,700,310 A | 12/1997 | Bowman et al. |
| 5,752,994 A | 5/1998 | Monacelli et al. |
| 5,853,548 A | 12/1998 | Piskorz et al. |
| 5,861,046 A | 1/1999 | Andersson |
| 6,248,796 B1 | 6/2001 | Jackson et al. |
| 6,667,022 B2 | 12/2003 | Cole |
| 6,680,137 B2 | 1/2004 | Paisley |
| 6,753,353 B2 | 6/2004 | Jackson et al. |
| 6,863,878 B2 | 3/2005 | Klepper |
| 7,214,720 B2 | 5/2007 | Bayle et al. |
| 7,220,390 B2 | 5/2007 | Tonkovich et al. |
| 7,309,378 B2 | 12/2007 | Bancon et al. |
| 7,572,362 B2 | 8/2009 | Freel et al. |
| 7,857,995 B2 | 12/2010 | Johnson et al. |
| 7,879,919 B2 | 2/2011 | Ernst et al. |
| 7,905,990 B2 | 3/2011 | Freel |
| 7,964,004 B2 | 6/2011 | Koch et al. |
| 8,007,688 B2 | 8/2011 | Dahlin et al. |
| 8,084,656 B2 | 12/2011 | Feldmann |
| 8,137,655 B2 | 3/2012 | Chornet et al. |
| 8,168,686 B2 | 5/2012 | Blevins et al. |
| 8,580,152 B2 | 11/2013 | Sutradhar et al. |
| 8,585,789 B2 | 11/2013 | Sutradhar et al. |
| 8,726,800 B2 | 5/2014 | Murray et al. |
| 8,889,746 B2 | 11/2014 | Kresnyak |
| 8,894,885 B2 | 11/2014 | Bell et al. |
| 9,227,790 B2 | 1/2016 | Perez |
| 2006/0117952 A1 | 6/2006 | Bancon et al. |
| 2006/0130444 A1 | 6/2006 | Smith et al. |
| 2008/0023338 A1 | 1/2008 | Stoots et al. |
| 2008/0222956 A1 | 9/2008 | Tsangaris et al. |
| 2008/0264254 A1 | 10/2008 | Song et al. |
| 2008/0282892 A1 | 11/2008 | Deckman et al. |
| 2009/0151250 A1 | 6/2009 | Agrawal |
| 2009/0217584 A1 | 9/2009 | Raman et al. |
| 2009/0229464 A1 | 9/2009 | Robertson |
| 2009/0232729 A1 | 9/2009 | Genkin et al. |
| 2010/0011955 A1 | 1/2010 | Hufton et al. |
| 2010/0018115 A1 | 1/2010 | Wallace et al. |
| 2010/0051875 A1 | 3/2010 | Chornet et al. |
| 2010/0096594 A1 | 4/2010 | Dahlin et al. |
| 2010/0129691 A1 | 5/2010 | Dooher et al. |
| 2010/0162625 A1 | 7/2010 | Mills |
| 2010/0181539 A1 | 7/2010 | Apanel et al. |
| 2010/0196227 A1 | 8/2010 | Venderbosch et al. |
| 2010/0307335 A1 | 12/2010 | Hayward |
| 2011/0031103 A1 | 2/2011 | Deckman et al. |
| 2011/0036014 A1 | 2/2011 | Tsangaris et al. |
| 2011/0116986 A1 | 5/2011 | Balint et al. |
| 2011/0248218 A1 | 10/2011 | Sutradhar et al. |
| 2011/0250661 A1 | 10/2011 | Sutradhar et al. |
| 2011/0297885 A1 | 12/2011 | Boerrigter et al. |
| 2013/0306913 A1 | 11/2013 | Li et al. |
| 2014/0158940 A1 | 6/2014 | Navaee-Ardeh et al. |
| 2016/0001304 A1 | 1/2016 | Pavel et al. |
| 2017/0130148 A1* | 5/2017 | Lau .................. F23C 10/24 |
| 2018/0290094 A1* | 10/2018 | Chandran .............. C10G 2/34 |

* cited by examiner

AUTOMATED LEVEL AND DENSITY MEASUREMENT SYSTEM (1000)
NORMAL MODE OF OPERATION (FIRST EMBODIMENT)

AUTOMATED LEVEL AND DENSITY MEASUREMENT SYSTEM (1000)
PURGE MODE OF OPERATION (FIRST EMBODIMENT)

FIGURE 3
Valve States for Automated Controller Operation

| DESCRIPTION | | MODE 1: NORMAL OPERATION | MODE 2: PURGE OPERATION |
|---|---|---|---|
| upper nozzle valve (V1) | | | |
| | instrument port (V1A) | OPEN | CLOSED |
| | purge port (V1B) | CLOSED | OPEN |
| | common port (V1C) | OPEN | OPEN |
| middle nozzle valve (V2) | | | |
| | instrument port (V2A) | OPEN | CLOSED |
| | purge port (V2B) | CLOSED | OPEN |
| | common port (V2C) | OPEN | OPEN |
| lower nozzle valve (V3) | | | |
| | instrument port (V3A) | OPEN | CLOSED |
| | purge port (V3B) | CLOSED | OPEN |
| | common port (V3C) | OPEN | OPEN |

SYSTEM 1000 IN NORMAL MODE, SYSTEM 1000' IN PURGE MODE
(SECOND EMBODIMENT)

SYSTEM 1000 IN NORMAL MODE, SYSTEM 1000' IN PURGE MODE
(THIRD EMBODIMENT)

AUTOMATED LEVEL AND DENSITY MEASUREMENT SYSTEM (1001)
NORMAL MODE OF OPERATION (FOURTH EMBODIMENT)

AUTOMATED LEVEL AND DENSITY MEASUREMENT SYSTEM (1001)
PURGE MODE OF OPERATION (FOURTH EMBODIMENT)

FIGURE 11
Valve States for Automated Controller Operation

| DESCRIPTION | MODE 3:<br>NORMAL OPERATION | MODE 4:<br>PURGE OPERATION |
|---|---|---|
| upper instrument valve (V4) | OPEN | CLOSED |
| upper purge valve (V5) | CLOSED | OPEN |
| middle instrument valve (V6) | OPEN | CLOSED |
| middle purge valve (V7) | CLOSED | OPEN |
| lower instrument valve (V8) | OPEN | CLOSED |
| lower purge valve (V9) | CLOSED | OPEN |

PRESSURE-BASED METHOD AND SYSTEM FOR MEASURING THE DENSITY AND HEIGHT OF A FLUIDIZED BED

TECHNICAL FIELD

The present disclosure relates to the field of automated level and density measurement systems and methods for fluidized bed applications.

BACKGROUND

The present disclosure relates to the field of automated level and density measurement systems for fluidized bed applications. Specifically, this disclosure generally relates to improvements to prevent blockage in conduits and nozzles used in fluidized bed applications by providing an automated computer operated purge system and methodology. In embodiments, a conduit may, for example, be a tube or a pipe. In embodiments, the conduit may be a tube or pipe made of metal, such as a stainless-steel, with a diameter of about 1/16", 1/8", 1/4", 3/8", 1/2", 3/4", 1", or 1" to 2", or greater. In embodiments, a conduit may be used to connect one area of an operating facility to a sensor, such as a pressure sensor, differential pressure sensor, freeboard pressure sensor, level sensor, density sensor, or a fluidization grid differential pressure sensor for the measurement of pressure.

Blockage, or clogging, of conduits that are used to measure pressure within a vessel poses a serious problem to plant operations. Erroneous differential pressure readings which results from clogging, plugging, blocking, or bridging are difficult to identify and quantify in magnitude because of the many factors contributing thereto. False readings may also be due to leaks in conduits, ruptured conduits, loss or change in flow rate of purge gas. However, blockage of solids within a nozzle or conduit poses the most serious problem because of the difficulty of its detection.

Conduits may at times have the tendency to becomes blocked, clogged, bridged, or plugged with solids, frozen liquids, condensed tars, or particulate heat transfer material. Some blocking mechanisms include condensation of water within a conduit or network of conduits. In cooler climates, if relatively long conduit runs are installed and exposed to the elements of nature, freezing of condensation or liquid may also occur which may result in rupture of the conduit.

Blockage of conduits used for measurement of a pressure causes fluid bed pressure, level, and density information to be lost, with potentially serious consequences in a process control application. Avoiding blockages is a primary aim of the present disclosure. Avoiding blockages is of paramount importance to the reliability of fluidized bed systems to continuously operate in an unimpeded manner.

Without an automated level and density measurement system, a plant operator might have to physically and periodically locate themselves at a particular location in the facility to manually increase the flow through a conduit to periodically to dislodge blockage or prevent blockage conditions that may be taking place within the conduit. The manual process of physically manipulating and increasing the flow of gas through the conduits is unsustainable, unreliable, and time-intensive, often having to take up to twice a shift on a 12-hour shift to complete a trivial task. In the event an operator does not make his/her rounds to purge-out downstream conduits, the conduit will become clogged, rendering the connected instrumentation useless. And it is nearly impossible to operate a fluidized bed in a proper manner without differential pressure, level, and density data.

There exists a need to automatically periodically clean conduits used to measure pressure in fluidized bed applications during normal operation. This may be accomplished by use of a computer operated network of valves and conduits to provide an instantaneous, high flow, high pressure, high-volume burst of pressurized gas to the conduits and nozzles and into the interior of the vessel. During the time for purging conduits, differential pressure instruments or sensors may be isolated from the vessel and configured to momentarily not read the pressure of within the interior of the vessel. Instead, for a sudden instantaneous moment of time, a supply of pressurized gas is provided to the network of conduits to dislodge any blockages that may have deposited therein.

SUMMARY

This Summary is provided merely to introduce certain concepts and not to identify any key or essential features of the claimed subject matter.

Paragraph A: A method for calculating the height and the density of a fluidized bed (102) in a vessel (100), the vessel (100) having an interior (101), a top (103), a bottom (104), and a longitudinal axis (AX) extending along a height direction of the vessel (100), the vessel (100) further having a lower nozzle (N3) close to the bottom (104) and connected to a lower nozzle conduit (A05), an upper nozzle (N1) close to the top (103) and connected to an upper nozzle conduit (A15), and a middle nozzle (N2) positioned between the upper and lower nozzles and connected to a middle nozzle conduit (A10), said fluidized bed (102) having a bed height (L) that is between the upper nozzle (N1) and middle nozzle (N2), the method comprising:

(a) in a first mode of operation:
 (i) obtaining a first differential pressure (1DP) representative of a difference between a first pressure in the upper nozzle conduit (A15) and a third pressure in the lower nozzle conduit (A05);
 (ii) obtaining a second differential pressure (2DP) representative of a difference between a second pressure in the middle nozzle conduit (A10) and the third pressure in the lower nozzle conduit (A05);
 (iii) calculating a bed density (RHO) of the fluidized bed (102) based on the second differential pressure (2DP) and a height difference between the middle nozzle (N2) and the lower nozzle (N3);
 (iv) calculating a bed height (L) by dividing the first differential pressure (1DP) by said calculated bed density (RHO);

(b) in a second mode of operation:
 (i) purging said upper, lower, and middle nozzles (N1, N2, N3) by introducing a pressurized gas (A00) into the vessel's interior (101), via:
 the upper nozzle conduit (A15) and the upper nozzle (N1);
 the middle nozzle conduit (A10) and the middle nozzle (N2); and
 the lower nozzle conduit (A05) and the lower nozzle (N3).

Paragraph B: The method according to Paragraph A, further comprising:
 introducing a pressurized gas (A00) through a porous element (PE1, PE2, PE3) and then into the vessel's interior (101), via a first porous element (PE1), a second porous element (PE2), and a third porous element (PE3), and via the upper nozzle conduit (A15), middle nozzle conduit (A10), and lower nozzle conduit (A05), to purge said upper, middle, and lower nozzles (N1, N2, N3).

Paragraph C: The method according to Paragraph B, wherein each porous element (PE1, PE2, PE3) has openings ranging from 0.25 microns to 100 microns.

Paragraph D: The method according to Paragraph A, further comprising providing:
  (i) an upper nozzle valve (V1) including: an upper instrument port (V1A) in fluid communication with a level sensor (LT) configured to measure a first pressure in the upper nozzle conduit (A15), an upper purge port (V1B) in fluid communication with a supply of pressurized gas (A00), and an upper common port (V1C) connected to the upper nozzle (N1) via an upper nozzle conduit (A15);
  (ii) a middle nozzle valve (V2) including: a middle instrument port (V2A) in fluid communication with a density sensor (DT) configured to measure a second pressure in the middle nozzle conduit (A10), a middle purge port (V2B) in fluid communication with a supply of pressurized gas (A00), and a middle common port (V2C) connected to the middle nozzle (N2) via a middle nozzle conduit (A10); and
  (iii) a lower nozzle valve (V3) including: a lower instrument port (V3A) in fluid communication with both the level sensor (LT) and density sensor (DT) and configured to measure a third pressure in the lower nozzle conduit (A05), a lower purge port (V3B) in fluid communication with a supply of pressurized gas (A00), and a lower common port (V3C) connected to the lower nozzle (N3) via a lower nozzle conduit (A05);
wherein:
(a) in a first mode of operation:
  (a1) the level sensor (LT) measures the first pressure in the upper nozzle conduit (A15) through the upper instrument port (V1A) and the upper common port (V1C) of the upper nozzle valve (V1),
  (a2) the density sensor (DT) measures the second pressure in the middle nozzle conduit (A10) through the middle instrument port (V2A) and the middle common port (V2C) of the middle nozzle valve (V2), and
  (a3) the level sensor (LT) and density sensor (DT) measure the third pressure in the lower nozzle conduit (A05) through the lower instrument port (V3A) and the lower common port (V3C) of the lower nozzle valve (V3); and
(b) in a second mode of operation:
  (b1) purging the upper nozzle (N1) by passing pressurized gas (A00) through the upper purge port (V1B) to the upper common port (V1C) of the upper nozzle valve (V1) and into the upper nozzle conduit (A15) and the upper nozzle (N1),
  (b2) purging the middle nozzle (N2) by passing pressurized gas (A00) through the middle purge port (V2B) to the middle common port (V2C) of the middle nozzle valve (V2) and into the middle nozzle conduit (A10) and the middle nozzle (N2), and
  (b3) purging the lower nozzle (N3) by passing pressurized gas (A00) through the lower purge port (V3B) to the lower common port (V3C) of the lower nozzle valve (V3) and into the lower nozzle conduit (A05) and the lower nozzle (N3).

Paragraph E: The method according to Paragraph A, wherein:
the vessel (100) has a plurality of upper nozzles (N1, N1'), a plurality of middle nozzles (N2, N2'), and a plurality of lower nozzles (N3, N3') that are organized into three vertically spaced-apart clusters (1CL, 2CL, 3CL), a first upper cluster (1CL) including the plurality of upper nozzles (N1, N1'), a second middle cluster (2CL) including a plurality of middle nozzles (N2, N2'), and a third lower cluster (3CL) including the plurality of lower nozzles (N3, N3'), the lower cluster (3CL) is close to the bottom (104), the upper cluster (1CL) is close to the top (103), and the middle cluster (2CL) positioned between the upper and lower clusters (1CL, 3CL), said fluidized bed (102) having a bed height (L) that is between the upper cluster (1CL) and the middle cluster (2CL);
in said first mode of operation:
  (i) obtaining a first differential pressure (1DP) that is representative of an average difference in pressures between a first cluster (1CL) and a third cluster (3CL);
  (ii) obtaining a second differential pressure (2DP) that is representative of an average difference in pressures between a second cluster (2CL) and the third cluster (3CL);
  (iii) calculating a bed density (RHO) of the fluidized bed (102) based on the second differential pressure (2DP) and at least one height difference between at least one middle nozzle (N2, N2') and at least one the lower nozzle (N3, N3');
  (iv) calculating a bed height (L) by dividing the first differential pressure (1DP) by said calculated bed density (RHO);
in said second mode of operation:
  (i) the pressurized gas (A00) is introduced into the vessel's interior (101), via the pluralities of upper, middle, and lower nozzles (N1, N1', N2, N2', N3, N3').

Paragraph F: The method according to Paragraph A, wherein:
the vessel (100) has one upper nozzle (N1), a plurality of middle nozzles (N2, N2') and a plurality of lower nozzles (N3, N3') that are organized into two vertically spaced-apart clusters (2CL, 3CL) positioned below the upper nozzle (N1), a middle cluster (2CL) including a plurality of middle nozzles (N2, N2'), and a lower cluster (3CL) including the plurality of lower nozzles (N3, N3'), the lower cluster (3CL) is close to the bottom (104), the upper nozzle (N1) is close to the top (103), and the middle cluster (2CL) positioned between the upper nozzle (N1) and lower cluster (3CL), said fluidized bed (102) having a bed height (L) that is between the upper nozzle (N1) and the middle cluster (2CL);
in said first mode of operation:
  (i) obtaining a first differential pressure (1DP) that the difference in pressure between the upper nozzle (N1) and a lower nozzle (N3, N3') of the third cluster (3CL);
  (ii) obtaining a second differential pressure (2DP) that is representative of an average difference in pressures between a second cluster (2CL) and the third cluster (3CL);
  (iii) calculating a bed density (RHO) of the fluidized bed (102) based on the second differential pressure (2DP) and at least one height difference between at least one middle nozzle (N2, N2') and at least one the lower nozzle (N3, N3');
  (iv) calculating a bed height (L) by dividing the first differential pressure (1DP) by said calculated bed density (RHO);

in said second mode of operation:
  (i) the pressurized gas (A00) is introduced into the vessel's interior (100), via the upper nozzle and pluralities of middle and lower (N1, N2, N2', N3, N3').

Paragraph G: The method according to Paragraph A, wherein:
the vessel (100) has a plurality of lower nozzles (N3, N3') close to the bottom (104), one upper nozzle (N1) close to the top (103), and a plurality of middle nozzles (N2, N2') positioned between the upper nozzle (N1) and the plurality of lower nozzles (N3, N3'), said fluidized bed (102) having a bed height (L) that is between the upper nozzle (N1) the uppermost of the middle nozzles (N2, N2');
in said first mode of operation:
  (i) the first differential pressure (1DP) is representative of the difference in pressure between a first pressure at the upper nozzle (N1) and a third pressure at the lowermost lower nozzle (N3, N3');
  (ii) the second differential pressure (2DP) is representative of an average difference in pressures between the first middle pressure (PN2) and second middle pressure (PN2') at the plurality of middle nozzles (N2, N2') and the first lower pressure (PN3) and second lower pressure (PN3') at the plurality of lower nozzles (N3, N3');
  (iii) calculating a bed density (RHO) of the fluidized bed (102) based on the second differential pressure (2DP) and at least one height difference between the plurality of middle nozzles (N2, N2') and the plurality of lower nozzles (N3, N3');
  (iv) calculating a bed height (L) by dividing the first differential pressure (1DP) by said calculated bed density (RHO);
in said second mode of operation:
  (i) the pressurized gas (A00) is introduced into the vessel's interior (101), via the upper nozzle and pluralities of middle and lower (N1, N2, N2', N3, N3').

Paragraph H: The method according to Paragraph A, wherein:
the vessel (100) has a plurality of lower nozzles (N3, N3') close to the bottom (104), a plurality of upper nozzles (N1, N1') close to the top (103), and a plurality of middle nozzles (N2, N2') positioned between the upper and lower nozzles (N1, N1', N3, N3'), both upper nozzles (N1, N1') are located at the same upper nozzle height (H1), both middle nozzles (N2, N2') are located at the same middle nozzle height (H2), both lower nozzles (N3, N3') are located at the same lower nozzle height (H3), said fluidized bed (102) having a bed height (L) that is between the upper nozzles (N1, N1') and middle nozzles (N2, N2');
in said first mode of operation:
  (i) obtaining a first differential pressure (1DP) that is representative of the difference in pressure between the first upper nozzle (N1) and a first lower nozzle (N3);
  (ii) obtaining a secondary first differential pressure (1DPB) is representative of the difference in pressure between the second upper nozzle (N1') and a second lower nozzle (N3');
  (iii) obtaining a second differential pressure (2DP) that is representative of the difference in pressure between a first middle nozzle (N2) and a first lower nozzle (N3);
  (iv) obtaining a secondary second differential pressure (2DPB) that is representative of the difference in pressure between a second middle nozzle (N2') and a second lower nozzle (N3');
  (v) calculating a first bed density (RHO-1) of the fluidized bed (102) based on the second differential pressure (2DP) and the height between the first middle nozzle (N2) and a first lower nozzle (N3);
  (vi) calculating a second bed density (RHO-2) of the fluidized bed (102) based on the secondary second differential pressure (2DPB) and the height between the second middle nozzle (N2') and a second lower nozzle (N3');
  (vii) calculating a first bed height (L-1) by dividing the first differential pressure (IDP) by said first bed density (RHO-1);
  (viii) calculating a second bed height (L-2) by dividing the secondary first differential pressure (1DPB) by said second bed density (RHO-2);
  (ix) calculating an average bed height (L) by averaging the first bed height (L-1) and the second bed height (L-2);
in said second mode of operation:
  (i) the pressurized gas (A00) is introduced into the vessel's interior (101), via the pluralities of upper, middle, and lower nozzles (N1, N1', N2, N2', N3, N3').

Paragraph I: The method according to Paragraph A, wherein:
the vessel (100) has a plurality of lower nozzles (N3, N3') close to the bottom (104), a plurality of upper nozzles (N1, N1') close to the top (103), and a plurality of middle nozzles (N2, N2') positioned between the upper and lower nozzles (N1, N1', N3, N3'), both upper nozzles (N1, N1') are located at the same upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), said fluidized bed (102) having a bed height (L) that is between the upper nozzles (N1, N1') and uppermost middle nozzle (UN2);
in said first mode of operation:
  (i) obtaining a first differential pressure (1DP) that is representative of the difference in pressure between the first upper nozzle (N1) and a lowermost lower nozzle (LN3);
  (ii) obtaining a secondary first differential pressure (1DPB) is representative of the difference in pressure between the second upper nozzle (N1') and a lowermost lower nozzle (LN3);
  (iii) obtaining a second differential pressure (2DP) that is representative of the difference in pressure between an uppermost middle nozzle (UN2) and an uppermost lower nozzle (UN3);
  (iv) obtaining a secondary second differential pressure (2DPB) that is representative of the difference in pressure between a lowermost middle nozzle (LN2) and a lowermost lower nozzle (LN3);
  (v) calculating a first bed density (RHO-1) of the fluidized bed (102) based on the second differential pressure (2DP) and the height between the uppermost middle nozzle (UN2) and an uppermost lower nozzle (UN3);
  (vi) calculating a second bed density (RHO-2) of the fluidized bed (102) based on the secondary second differential pressure (2DPB) and the height between lowermost middle nozzle (LN2) and a lowermost lower nozzle (LN3);

(vii) calculating a first bed height (L-1) by dividing the first differential pressure (1DP) by said first bed density (RHO-1);
(viii) calculating a second bed height (L-2) by dividing the secondary first differential pressure (1DPB) by said second bed density (RHO-2);
(ix) calculating an average bed height (L) by averaging the first bed height (L-1) and the second bed height (L-2);

in said second mode of operation:
  (i) the pressurized gas (A00) is introduced into the vessel's interior (101), via the pluralities of upper, middle, and lower nozzles (N1, N1', N2, N2', N3, N3').

Paragraph J: The method according to Paragraph A, wherein:

the vessel (100) has a plurality of lower nozzles (N3, N3') close to the bottom (104), a plurality of upper nozzles (N1, N1') close to the top (103), and a plurality of middle nozzles (N2, N2') positioned between the upper and lower nozzles (N1, N1', N3, N3'), both upper nozzles (N1, N1') are located at the same upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), said fluidized bed (102) having a bed height (L) that is between the upper nozzles (N1, N1') and uppermost middle nozzle (UN2);

in said first mode of operation:
  (i) obtaining a first differential pressure (1DP) that is representative of the difference in pressure between the first upper nozzle (N1) and a lowermost lower nozzle (LN3);
  (ii) obtaining a secondary first differential pressure (1DPB) is representative of the difference in pressure between the second upper nozzle (N1') and a lowermost lower nozzle (LN3);
  (iii) obtaining a second differential pressure (2DP) that is representative of the difference in pressure between an uppermost middle nozzle (UN2) and a lowermost lower nozzle (LN3);
  (iv) obtaining a secondary second differential pressure (2DPB) that is representative of the difference in pressure between a lowermost middle nozzle (LN2) and an uppermost lower nozzle (UN3);
  (v) calculating a first bed density (RHO-1) of the fluidized bed (102) based on the second differential pressure (2DP) and the height between the uppermost middle nozzle (UN2) and a lowermost lower nozzle (LN3);
  (vi) calculating a second bed density (RHO-2) of the fluidized bed (102) based on the secondary second differential pressure (2DPB) and the height between lowermost middle nozzle (LN2) and an uppermost lower nozzle (UN3);
  (vii) calculating a first bed height (L-1) by dividing the first differential pressure (1DP) by said first bed density (RHO-1);
  (viii) calculating a second bed height (L-2) by dividing the secondary first differential pressure (1DPB) by said second bed density (RHO-2);
  (ix) calculating an average bed height (L) by averaging the first bed height (L-1) and the second bed height (L-2);

in said second mode of operation:
  (i) the pressurized gas (A00) is introduced into the vessel's interior (101), via the pluralities of upper, middle, and lower nozzles (N1, N1', N2, N2', N3, N3').

Paragraph K: The method according to Paragraph A, wherein:

the vessel (100) has a plurality of lower nozzles (N3, N3') close to the bottom (104), one upper nozzle (N1) close to the top (103), and a plurality of middle nozzles (N2, N2') positioned between the upper nozzle (N1) and lower nozzles (N3, N3'), the upper nozzle (N1) is located an upper nozzle height (H1), both middle nozzles (N2, N2') are located at the same middle nozzle height (H2), both lower nozzles (N3, N3') are located at the same lower nozzle height (H3), said fluidized bed (102) having a bed height (L) that is between the upper nozzle (N1) and middle nozzles (N2, N2');

in said first mode of operation:
  (i) obtaining a first differential pressure (1DP) that is representative of the difference in pressure between the upper nozzle (N1) and a first lower nozzle (N3);
  (ii) obtaining a second differential pressure (2DP) that is representative of the difference in pressure between a first middle nozzle (N2) and a first lower nozzle (N3);
  (iii) obtaining a secondary second differential pressure (2DPB) that is representative of the difference in pressure between a second middle nozzle (N2') and a second lower nozzle (N3');
  (iv) calculating a first bed density (RHO-1) of the fluidized bed (102) based on the second differential pressure (2DP) and the height between the first middle nozzle (N2) and a first lower nozzle (N3);
  (v) calculating a second bed density (RHO-2) of the fluidized bed (102) based on the secondary second differential pressure (2DPB) and the height between the second middle nozzle (N2') and a second lower nozzle (N3');
  (vi) calculating an average bed density (RHO) by averaging the first bed density (RHO-1) and the second bed density (RHO-2);
  (vii) calculating a bed height (L) by dividing the first differential pressure (1DP) by the average bed density (RHO);

in said second mode of operation:
  (i) the pressurized gas is (A00) introduced into the vessel's interior (101), via the upper nozzle (N1) and pluralities of middle and lower nozzles (N2, N2', N3, N3').

Paragraph L: The method according to Paragraph A, wherein:

the vessel (100) has a plurality of lower nozzles (N3, N3') close to the bottom (104), one upper nozzle (N1) close to the top (103), and a plurality of middle nozzles (N2, N2') positioned between the upper nozzle (N1) and lower nozzles (N3, N3'), the upper nozzle (N1) is located an upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), said fluidized bed (102) having a bed height (L) that is between the upper nozzle (N1) and uppermost middle nozzle (UN2);

in said first mode of operation:
(i) obtaining a first differential pressure (1DP) that is representative of the difference in pressure between the upper nozzle (N1) and a lowermost lower nozzle (LN3);
(ii) obtaining a second differential pressure (2DP) that is representative of the difference in pressure between an uppermost middle nozzle (UN2) and an uppermost lower nozzle (UN3);
(iii) obtaining a secondary second differential pressure (2DPB) that is representative of the difference in pressure between a lowermost middle nozzle (LN2) and a lowermost lower nozzle (LN3);
(iv) calculating a first bed density (RHO-1) of the fluidized bed (102) based on the second differential pressure (2DP) and the height between the uppermost middle nozzle (UN2) and an uppermost lower nozzle (UN3);
(v) calculating a second bed density (RHO-2) of the fluidized bed (102) based on the secondary second differential pressure (2DPB) and the height between lowermost middle nozzle (LN2) and a lowermost lower nozzle (LN3);
(vi) calculating an average bed density (RHO) by averaging the first bed density (RHO-1) and the second bed density (RHO-2);
(vii) calculating a bed height (L) by dividing the first differential pressure (1DP) by the average bed density (RHO);

in said second mode of operation:
(i) the pressurized gas is (A00) introduced into the vessel's interior (101), via the upper nozzle (N1) and pluralities of middle and lower nozzles (N2, N2', N3, N3').

Paragraph M: The method according to Paragraph A, wherein:
the vessel (100) has a plurality of lower nozzles (N3, N3') close to the bottom (104), one upper nozzle (N1) close to the top (103), and a plurality of middle nozzles (N2, N2') positioned between the upper nozzle (N1) and lower nozzles (N3, N3'), the upper nozzle (N1) is located an upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), said fluidized bed (102) having a bed height (L) that is between the upper nozzle (N1) and uppermost middle nozzle (UN2);

in said first mode of operation:
(i) obtaining a first differential pressure (1DP) that is representative of the difference in pressure between the upper nozzle (N1) and a lowermost lower nozzle (LN3);
(ii) obtaining a second differential pressure (2DP) that is representative of the difference in pressure between an uppermost middle nozzle (UN2) and a lowermost lower nozzle (LN3);
(iii) obtaining a secondary second differential pressure (2DPB) that is representative of the difference in pressure between a lowermost middle nozzle (LN2) and an uppermost lower nozzle (UN3);
(iv) calculating a first bed density (RHO-1) of the fluidized bed (102) based on the second differential pressure (2DP) and the height between the uppermost middle nozzle (UN2) and a lowermost lower nozzle (LN3);
(v) calculating a second bed density (RHO-2) of the fluidized bed (102) based on the secondary second differential pressure (2DPB) and the height between lowermost middle nozzle (LN2) and an uppermost lower nozzle (UN3);
(vi) calculating an average bed density (RHO) by averaging the first bed density (RHO-1) and the second bed density (RHO-2);
(vii) calculating a bed height (L) by dividing the first differential pressure (1DP) by the average bed density (RHO);

in said second mode of operation:
(i) the pressurized gas is (A00) introduced into the vessel's interior (101), via the upper nozzle (N1) and pluralities of middle and lower nozzles (N2, N2', N3, N3').

Paragraph N: The method according to Paragraph A, further comprising:
in the second mode of operation:
(i) suspending measurement of the first differential pressure (1DP) between the upper nozzle (N1) and lower nozzle (N3) while simultaneously introducing a pressurized gas (A00) to purge the upper nozzle (N1) and lower nozzle (N3); and,
(ii) suspending measurement of the second differential pressure (2DP) between the middle nozzle (N2) and the lower nozzle (N3) while simultaneously introducing a pressurized gas (A00) to purge the middle nozzle (N2) and the lower nozzle (N3).

Paragraph O: The method according to Paragraph A, wherein:
the vessel (100) is equipped with a fluidization distribution grid (109) positioned within the vessel's interior (101), the vessel (100) is equipped with a fluidization medium input (108) connected to a fluidization medium supply conduit (107) that is configured to supply a fluidization medium (106) to the fluidization distribution grid (109), and a fluidization grid differential pressure sensor (DP) is configured to measure the pressure difference between the fluidization medium supply conduit (107) and in the lower nozzle (N3);
in the first mode of operation:
(i) the fluidization grid differential pressure sensor (DP) measures the pressure across the fluidization distribution grid (109) via the lower nozzle (N3) and fluidization medium supply conduit (107); and
in the second mode of operation:
(i) a pressurized gas is (A00) introduced into the vessel's interior (101) via the lower nozzle (N3).

Paragraph P: A method for measuring density and height of a fluidized bed in a vessel having an interior, a top, a bottom, and a longitudinal axis extending along a vertical height direction of the vessel, the vessel further having one or more upper nozzles each connected to a corresponding upper nozzle conduit, one or more lower nozzles each connected to a corresponding lower nozzle conduit, and one or more middle nozzles each connected to a corresponding middle nozzle conduit, the one or more middle nozzle conduits positioned between said one or more upper nozzles and said one or more lower nozzles in said vertical height direction, said fluidized bed having a bed height that is between the one or more upper nozzles and the one or more middle nozzles, the method comprising:

(a) in a measurement mode:
- (i) obtaining a first differential pressure reflective of a difference between: a first pressure corresponding to the one or more upper nozzle conduits and a third pressure corresponding to the one or more lower nozzle conduits;
- (ii) obtaining a second differential pressure reflective of a difference between: a second pressure corresponding to the one or more middle nozzle conduits and a fourth pressure which corresponds to the one or more lower nozzle conduits;
- (iii) calculating a bed density of the fluidized bed based on the second differential pressure and a differential height reflective of a difference between: a middle height associated with the one or more middle nozzles and a lower height associated with the one or more lower nozzles;
- (iv) calculating the bed height based on the first differential pressure and said calculated bed density; and (b) in a purge mode:
- (i) purging at least some of said nozzles by introducing pressurized gas into the vessel's interior, first via the nozzle conduits corresponding to the nozzles being purged and then via the nozzles being purged themselves.

Paragraph Q: The method according to Paragraph P, comprising, in said purge mode:
passing said pressurized gas through a porous element associated with each nozzle being purged.

Paragraph R: The method according to Paragraph Q, wherein each porous element has openings ranging from 0.25 microns to 100 microns.

Paragraph S: The method according to Paragraph P, further comprising:

(a) in the measurement mode:
- (a1) measuring pressure in one of the one or more upper nozzle conduits through a common first port and a second port of an upper three-port valve, the common first port of the upper three-port valve being in fluid communication with said one of the one or more upper nozzle conduits:
- (a2) measuring pressure in one of the one or more middle nozzle conduits through a common first port and a second port of a middle three-port valve, the common first port of the middle three-port valve being in fluid communication with said one of the one or more middle nozzle conduits: and
- (a3) measuring pressure in one of the one or more lower nozzle conduits through a first port and a common second port of a lower three-port valve, the common second port of the lower three-port valve being in fluid communication with said one of the one or more lower nozzle conduits; and (b) in the purge mode:
- (b1) purging the upper nozzle connected to said one of the one or more upper nozzle conduits through a third port and the common first port of the upper three-port valve;
- (b2) purging the middle nozzle connected to said one of the one or more middle nozzle conduits through a third port and the common first port of the middle three-port valve; and
- (b3) purging the lower nozzle connected to said one of the one or more lower nozzle conduits through a third port and the common first port of the lower three-port valve.

Paragraph T: The method according to Paragraph P, comprising, in the purge mode:
purging one or more upper nozzles and one or more lower nozzles, while suspending obtaining the first differential pressure; and
purging one or more middle nozzles and one or more lower nozzles, while suspending obtaining the second differential pressure.

Paragraph U: The method according to Paragraph P, wherein:
the vessel further comprises:
a fluidization distribution grid positioned within the vessel's interior,
a fluidization medium input connected to a fluidization medium supply conduit for supplying a fluidization medium to the fluidization distribution grid, and
a fluidization grid differential pressure sensor configured to measure a pressure difference between the fluidization medium supply conduit, and at the one or more lower conduits; and
the measurement mode further comprises:
measuring pressure across the fluidization distribution grid with the fluidization grid differential pressure sensor.

Paragraph V: The method according to Paragraph P, wherein:
the third pressure and fourth pressure both correspond to the same one or more lower nozzle conduits.

Paragraph W: The method according to Paragraph P, wherein:
the vessel has a plurality of upper nozzles belonging to an upper cluster, a plurality of lower nozzles belonging to a lower cluster, and a plurality of middle nozzles belonging to a middle cluster, the clusters being vertically spaced apart from one another in the vertical height direction, with the middle cluster positioned between the upper and lower clusters, said fluidized bed having a bed height that is between the upper cluster and the middle cluster;
the first pressure is an average pressure of the conduits belonging to the upper cluster;
the second pressure is an average pressure of the conduits belonging to the middle cluster;
the third pressure is an average pressure of the conduits belonging to the lower cluster;
the fourth pressure also is an average pressure of the conduits belonging to the lower cluster;
the middle height is an average height of nozzles belonging to the middle cluster; and
the lower height is an average height of nozzles belonging to the lower cluster.

Paragraph X: The method according to Paragraph P, wherein:
the vessel has a single upper nozzle, a plurality of lower nozzles belonging to a lower nozzle cluster, and a plurality of middle nozzles belonging to a middle cluster, the upper nozzle, the middle cluster and the lower cluster being vertically spaced apart from one another in the vertical height direction, with the middle cluster positioned between the upper nozzle and the lower cluster, said fluidized bed having a bed height that is between the upper nozzle and the middle cluster;
the first pressure is a pressure of the conduit corresponding to the single upper nozzle;
the second pressure is an average pressure of the conduits belonging to the middle cluster;

the third pressure is an average pressure of the conduits belonging to the lower cluster;

the fourth pressure also is an average pressure of the conduits belonging to the lower cluster;

the second pressure is an average pressure of the conduits belonging to the middle cluster;

the middle height is an average height of nozzles belonging to the middle cluster; and the lower height is an average height of nozzles belonging to the lower cluster.

Paragraph Y: The method according to Paragraph P, wherein:

the vessel has a single upper nozzle, a plurality of lower nozzles belonging to a lower nozzle cluster, and a plurality of middle nozzles belonging to a middle cluster, the upper nozzle, the middle cluster and the lower cluster being vertically spaced apart from one another in the vertical height direction, with the middle cluster positioned between the upper nozzle and the lower cluster, said fluidized bed having a bed height that is between the upper nozzle and the middle cluster;

the first pressure is a pressure of the conduit corresponding to the single upper nozzle;

the second pressure is an average pressure of the conduits belonging to the middle cluster;

the third pressure corresponds to a lowermost one of a plurality of conduits belonging to the lower cluster;

the fourth pressure is an average pressure of the conduits belonging to the lower cluster;

the second pressure is an average pressure of the conduits belonging to the middle cluster;

the middle height is an average height of nozzles belonging to the middle cluster; and the lower height is an average height of nozzles belonging to the lower cluster.

Paragraph Z: The method according to Paragraph P, wherein:

the vessel includes:

first and second upper nozzles, first and second lower nozzles, and first and second middle nozzles, the middle nozzles positioned in the vertical height direction between the upper nozzles and the lower nozzles, and the fluidized bed has a bed height that is between the upper nozzles and the middle nozzles.

Paragraph AA: The method according to Paragraph Z, comprising:

obtaining a first first differential pressure based on the first upper nozzle and the first lower nozzle;

obtaining a second first differential pressure based on the second upper nozzle and the second lower nozzle;

obtaining a first second differential pressure based on the first middle nozzle and the first lower nozzle;

obtaining a second second differential pressure based on the second middle nozzle and the second lower nozzle;

calculating a first bed density of the fluidized bed based on the first second differential pressure and a height difference between the first middle nozzle and the first lower nozzle;

calculating a second bed density of the fluidized bed based on the second second differential pressure and a height difference between the second middle nozzle and the second lower nozzle;

calculating a first bed height based on the first first differential pressure and the first bed density;

calculating a second bed height based on the second first differential pressure and the second bed density; and calculating an average bed height by averaging the first bed height and the second bed height.

Paragraph AB: The method according to Paragraph Z, wherein:

the vessel has an uppermost middle nozzle, a lowermost middle nozzle, an uppermost lower nozzle and a lowermost lower nozzle, and the method comprises:

obtaining a first first differential pressure based on the first upper nozzle and the lowermost lower nozzle;

obtaining a second first differential pressure based on the second upper nozzle and the lowermost lower nozzle;

obtaining a first second differential pressure based on the uppermost middle nozzle and the uppermost lower nozzle;

obtaining a second second differential pressure based on the lowermost middle nozzle and the lowermost lower nozzle;

calculating a first bed density of the fluidized bed based on the first second differential pressure and a height difference between the uppermost middle nozzle and the uppermost lower nozzle;

calculating a second bed density of the fluidized bed based on the second second differential pressure and a height difference between the lowermost middle nozzle and the lowermost lower nozzle;

calculating a first bed height based on the first first differential pressure and the first bed density;

calculating a second bed height based on the second first differential pressure and the second bed density; and calculating an average bed height by averaging the first bed height and the second bed height.

Paragraph AC: The method according to Paragraph Z, wherein:

the vessel has an uppermost middle nozzle, a lowermost middle nozzle, an uppermost lower nozzle and a lowermost lower nozzle, and the method comprises:

obtaining a first first differential pressure based on the first upper nozzle and the lowermost lower nozzle;

obtaining a second first differential pressure based on the second upper nozzle and the lowermost lower nozzle;

obtaining a first second differential pressure based on the uppermost middle nozzle and the lowermost lower nozzle;

obtaining a second second differential pressure based on the lowermost middle nozzle and the uppermost lower nozzle;

calculating a first bed density of the fluidized bed based on the first second differential pressure and a height difference between the uppermost middle nozzle and the lowermost lower nozzle;

calculating a second bed density of the fluidized bed based on the second second differential pressure and a height difference between the lowermost middle nozzle and the uppermost lower nozzle;

calculating a first bed height based on the first first differential pressure and the first bed density;

calculating a second bed height based on the second first differential pressure and the second bed density; and calculating an average bed height by averaging the first bed height and the second bed height.

Paragraph AD: The method according to Paragraph P, wherein:
the vessel includes:
a single upper nozzle, first and second lower nozzles, and first and second middle nozzles,
the middle nozzles positioned in the vertical height direction between the single upper nozzle and the lower nozzles, and
the fluidized bed has a bed height that is between the upper nozzle and the middle nozzles.

Paragraph AE: The method according to Paragraph AD, comprising:
obtaining the first differential pressure based on the single upper nozzle and the first lower nozzle;
obtaining a second first differential pressure based on the second upper nozzle and the second lower nozzle;
obtaining a first second differential pressure based on the first middle nozzle and the first lower nozzle;
obtaining a second second differential pressure based on the second middle nozzle and the second lower nozzle;
calculating a first bed density of the fluidized bed based on the first second differential pressure and a height difference between the first middle nozzle and the first lower nozzle;
calculating a second bed density of the fluidized bed based on the second second differential pressure and a height difference between the second middle nozzle and the second lower nozzle;
calculating an average bed density by averaging the first bed density and the second bed density; and
calculating the bed height based on the first differential pressure and the average bed density.

Paragraph AF: The method according to Paragraph AD, wherein:
the vessel has an uppermost middle nozzle, a lowermost middle nozzle, an uppermost lower nozzle and a lowermost lower nozzle, and
the method comprises:
obtaining the first differential pressure based on the single upper nozzle and the lowermost lower nozzle;
obtaining a first second differential pressure based on the uppermost middle nozzle and the uppermost lower nozzle;
obtaining a second second differential pressure based on the lowermost middle nozzle and the lowermost lower nozzle;
calculating a first bed density of the fluidized bed based on the first second differential pressure and a height difference between the uppermost middle nozzle and the uppermost lower nozzle;
calculating a second bed density of the fluidized bed based on the second second differential pressure and a height difference between the lowermost middle nozzle and the lowermost lower nozzle;
calculating an average bed density by averaging the first bed density and the second bed density; and
calculating the bed height based on the first differential pressure and the average bed density.

Paragraph AG: The method according to Paragraph AD, wherein:
the vessel has an uppermost middle nozzle, a lowermost middle nozzle, an uppermost lower nozzle and a lowermost lower nozzle, and
the method comprises:
obtaining the first differential pressure based on the single upper nozzle and the lowermost lower nozzle;
obtaining a first second differential pressure based on the uppermost middle nozzle and the lowermost lower nozzle;
obtaining a second second differential pressure based on the lowermost middle nozzle and the uppermost lower nozzle;
calculating a first bed density of the fluidized bed based on the first second differential pressure and a height difference between the uppermost middle nozzle and the lowermost lower nozzle;
calculating a second bed density of the fluidized bed based on the second second differential pressure and a height difference between the lowermost middle nozzle and the uppermost lower nozzle;
calculating an average bed density by averaging the first bed density and the second bed density; and
calculating the bed height based on the first differential pressure and the average bed density.

DESCRIPTION OF THE DRAWINGS

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 3 discloses the valve states for automated controller operation of the non-limiting embodiments shown in FIGS. 1 and 2.

FIG. 11 discloses the valve states for automated controller operation of the non-limiting embodiments shown in FIGS. 9 and 10.

DETAILED DESCRIPTION

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof. For instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

FIG. 1

Figure 1:
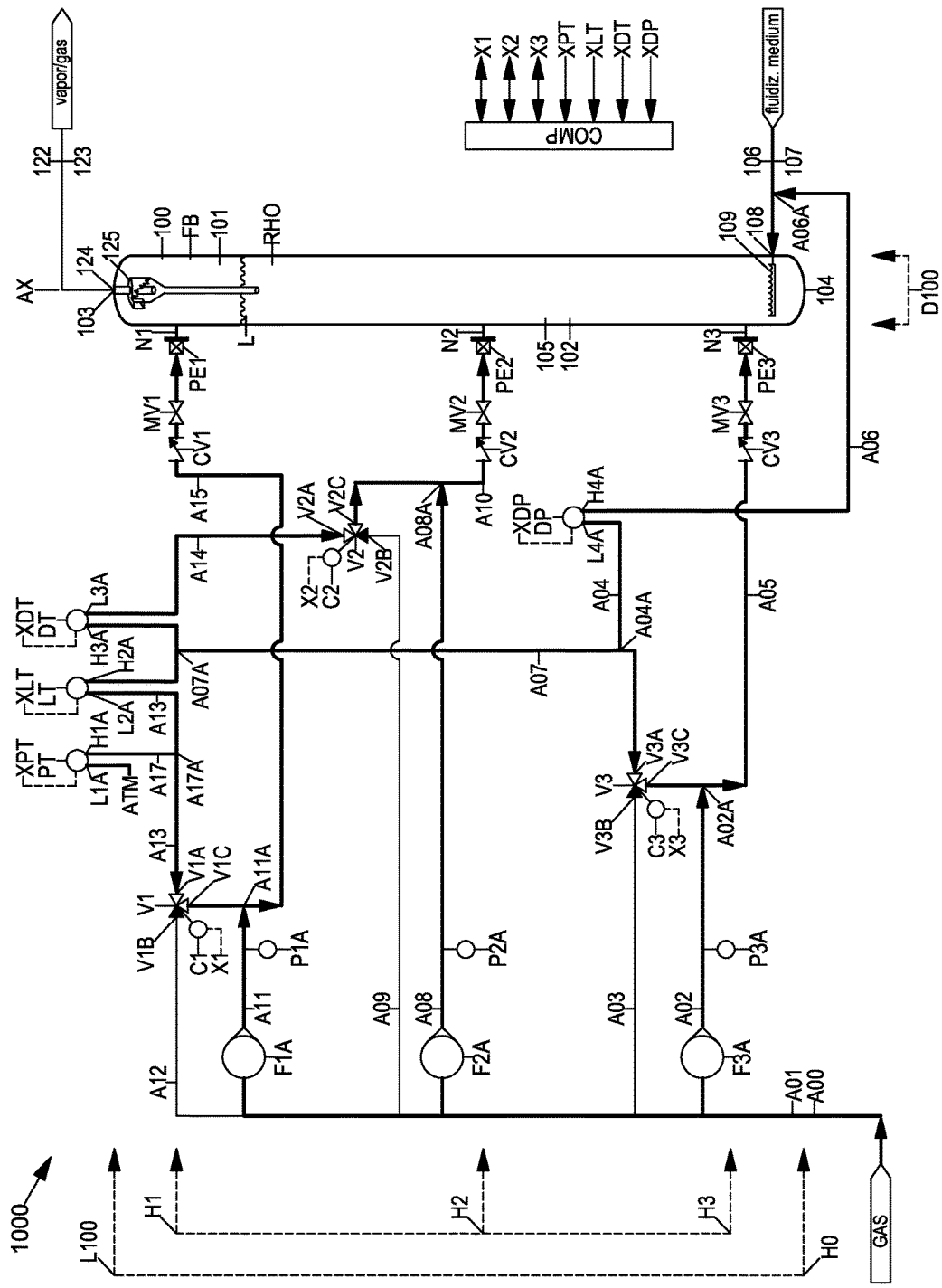
FIG. 1 depicts one non-limiting embodiment of an automated level and density measurement system (1000) including a vessel (100) equipped with a freeboard pressure sensor (PT), level sensor (LT), density sensor (DT), and a fluidization grid differential pressure sensor (DP) shown in a first mode of operation (Mode 1) under normal operating conditions.

FIG. 1 depicts one non-limiting embodiment of an automated level and density measurement system (1000) including a vessel (100) equipped with a freeboard pressure sensor (PT), level sensor (LT), density sensor (DT), and a fluidization grid differential pressure sensor (DP) shown in a first mode of operation (Mode 1) under normal operating conditions.

FIG. 1 depicts a first embodiment wherein a vessel (100) is equipped with an automated level and density measurement system (1000). The vessel (100) has an interior (101), a top (103), a bottom (104) and a longitudinal axis (AX) extending along a height (L100) direction of the vessel (100). A fluidized bed (102) of bed material (105) is positioned within the interior (101) of the vessel (100).

In embodiments, the fluidized bed is used for one or more from the group consisting of adsorption, agglomeration, aluminum anhydride production, biochemical production, calcining, carbonization of coal, chemical looping, chemical production, cleansing, coating of particulate materials, combustion of gaseous fuels, combustion of liquid fuels, combustion of solid fuels, conveying, cooling, cracking hydrocarbons, drying, fermentation, fluid catalytic cracking, fluidized bed combustion, fluidized bed reaction, freezing, gasification, granulation, heat transfer, interface modification, interface modification including applying a coating onto solid items, limestone calcining, mass transfer, nuclear fuel preparation, ore roasting, oxy-chlorination processes, particle sortation, particulate polishing, pharmaceutical production, pneumatic transport, polyethylene manufacturing, polymerization, pyrolysis, reaction, reforming hydrocarbons, roasting, spray drying, sterilization, storing of particulate solid materials, sulfide roasting, synthesis of polyethylene, thermal treating of particulate solid materials, ultrafiltration, vinyl-chloride production, waste treatment, and water treatment.

In embodiments, the bed material (105) may be one or more from the group consisting of absorbent, adsorbent, alumina, alumina bubbles, catalysts, cerium oxide, dolomite, limestone, metal catalysts, nanoparticles, non-catalytic material, olivine sand, particulates, sand, solids, and zirconia.

A fluidization medium (106) is introduced to the vessel (100) through a fluidization medium input (108) via a fluidization medium supply line (107). The fluidization medium (106) fluidizes the bed material (105). The fluidization medium (106) may be one or more from the group consisting of gas, vapor, gas-vapor mixture, superheated vapor, carbon dioxide, air, nitrogen, steam, superheated steam, flue gas, and hydrocarbons. The fluidization medium input (108) may be positioned close to the bottom (104) of the vessel (100).

A fluidization medium supply line (107) transfers a fluidization medium (106) into the interior (101) of the vessel (100) through the fluidization medium input (108) where it then is substantially evenly distributed over the cross-sectional area of the diameter (D100) of the vessel (100) via a fluidization distribution grid (109).

The vessel (100) further has an upper nozzle (N1), a middle nozzle (N2), and a lower nozzle (N3). The lower nozzle (N3) is close to the bottom (104), the upper nozzle (N1) is close to the top (103), and the middle nozzle (N2) is positioned between the upper nozzle (N1) and lower nozzle (N3). The fluidized bed (102) may have a bed height (L) that is between the upper nozzle (N1) and middle nozzle (N2).

The vessel (100) has a base height (H0) located at the bottom (104). The vessel (100) also has a height (L100) that extends from the base height (H0) located at the bottom (104) to the top (103). The upper nozzle (N1) has an upper nozzle height (H1) that is greater than both the middle nozzle height (H2) and lower nozzle height (H3). The middle nozzle (N2) has a middle nozzle height (H2) that is greater than the lower nozzle height (H3). The middle nozzle height (H2) is less than the upper nozzle height (H1). The lower nozzle (N3) has a lower nozzle height (H3) that is less than both the upper nozzle height (H1) and middle nozzle height (H2).

A freeboard zone (FB) is located above the bed height (L). An optional internal cyclone (125) may be positioned within the freeboard zone (FB) to collect elutriated bed material (105) to return to the fluidized bed (102). A vapor/gas output (124) is shown to be positioned on the top (103) of the vessel (100) to release a vapor/gas (122) from the interior (101) of the vessel (100). The vapor/gas (122) discharged from the vessel (100) via the vapor/gas output (124) is then routed away from the vessel (100) via a vapor/gas discharge line (123).

The automated level and density measurement system (1000) includes: (a) an upper nozzle valve (V1) including an upper instrument port (V1A), an upper purge port (V1B), and an upper common port (V1C), the upper common port (V1C) is always open and only one of the upper instrument port (V1A) and upper purge port (V1B) are open at any time; (b) a middle nozzle valve (V2) including a middle instrument port (V2A), a middle purge port (V2B), and a middle common port (V2C), the middle common port (V2C) is always open and only one of the middle instrument port (V2A) and middle port (V2B) are open at any time; and (c) a lower nozzle valve (V3) including a lower instrument port (V3A), a lower purge port (V3B), and a lower common port (V3C), the lower common port (V3C) is always open and only one of the lower instrument port (V3A) and lower port (V3B) are open at any time.

The upper nozzle valve (V1) is equipped with a controller (C1) that sends a signal (X1) to and from a computer (COMP). The signal (X1) from the computer (COMP) instructs whether to open or close either the upper instrument port (V1A) or the upper purge port (V1B). The middle nozzle valve (V2) is equipped with a controller (C2) that sends a signal (X2) to and from a computer (COMP). The signal (X2) from the computer (COMP) instructs whether to open or close either the middle instrument port (V2A) or middle purge port (V2B). The lower nozzle valve (V3) is equipped with a controller (C3) that sends a signal (X3) to and from a computer (COMP). The signal (X3) from the computer (COMP) instructs whether to open or close either the lower instrument port (V3A) or lower purge port (V3B).

The upper instrument port (V1A) is connected to the low-pressure port (L2A) of a level sensor (LT) via a LT upper nozzle conduit (A13). The level sensor (LT) is configured to obtain a first differential pressure (1DP) representative of a difference between a first pressure at the upper nozzle (N1) and a third pressure at the lower nozzle (N3). The level sensor (LT) is configured to obtain a first differential pressure (1DP) representative of a difference between a first pressure in the upper nozzle conduit (A15) and a third pressure in the lower nozzle conduit (A05). The level sensor (LT) is configured to output a differential pressure signal (XLT) to a computer (COMP).

The upper purge port (V1B) is connected to an upper high-flow gas conduit (A12). The upper common port (V1C) is connected to an upper nozzle (N1) of a vessel (100) via an upper nozzle conduit (A15). The upper high-flow gas conduit (A12) is connected to a purge gas supply header (A01). Pressurized gas (A00) within the purge gas supply header (A01) may be one or more from the group consisting of air, argon, carbon dioxide, flue gas, gas, hydrocarbons, and nitrogen.

An upper check valve (CV1) is positioned on the upper nozzle conduit (A15) in between the upper common port (V1C) and the upper nozzle (N1). An upper manual valve (MV1) is positioned on the upper nozzle conduit (A15) in between the upper check valve (CV1) and the upper nozzle (N1). The upper check valve (CV1) permits flow of purge gas from the upper nozzle conduit (A15) into the upper nozzle (N1) while still permitting the freeboard pressure sensor (PT) and level sensor (LT) to measure the pressure in the upper nozzle conduit (A15) and at the upper nozzle (N1). An upper porous element (PE1) is positioned on the upper nozzle conduit (A15) in between the upper manual valve (MV1) and the upper nozzle (N1). Preferably, the upper porous element (PE1) is positioned on the upper nozzle conduit (A15) at the interface between the upper nozzle conduit (A15) and the upper nozzle (N1) to prevent back-flow of bed material (105) and/or fluidization medium (106) into the upper nozzle conduit (A15).

An upper low-flow gas conduit (A11) is connected to the upper nozzle conduit (A15) in between the upper common port (V1C) and the upper nozzle (N1) via an upper connection (A11A). An upper low-flow gas conduit (A11) is connected to the purge gas supply header (A01). The upper low-flow gas conduit (A11) is configured to introduce a relatively lower flow of gas to the upper nozzle conduit (A15) when compared to the upper high-flow gas conduit (A12). During normal operation, a purge gas flows through the upper low-flow gas conduit (A11) and into the upper nozzle conduit (A15). The upper low-flow gas conduit (A11) is connected to the upper nozzle conduit (A15) via an upper connection (A11A). An upper flow sensor (F1A) is positioned on the upper low-flow gas conduit (A11). An upper pressure sensor (P1A) is positioned on the upper low-flow gas conduit (A11) in between the upper flow sensor (F1A) and the upper connection (A11A).

The middle instrument port (V2A) is connected to the low-pressure port (L3A) of a density sensor (DT) via a DT middle nozzle conduit (A14). The density sensor (DT) is configured to obtain a second differential pressure (2DP) representative of a difference between a second pressure at the middle nozzle (N2) and a third pressure at the lower nozzle (N3). The density sensor (DT) is configured to obtain a second differential pressure (2DP) representative of a difference between a second pressure in the middle nozzle conduit (A10) and the third pressure in the lower nozzle conduit (A05). The density sensor (DT) is configured to output a differential pressure signal (XDT) to a computer (COMP).

The middle purge port (V2B) is connected to a middle high-flow gas conduit (A09). The middle high-flow gas conduit (A09) is connected to the purge gas supply header (A01). The middle common port (V2C) is connected to a middle nozzle (N2) of the vessel (100) via a middle nozzle conduit (A10).

A middle check valve (CV2) is positioned on the middle nozzle conduit (A10) in between the middle common port (V2C) and the middle nozzle (N2). A middle manual valve (MV2) is positioned on the middle nozzle conduit (A10) in between the middle check valve (CV2) and the middle nozzle (N2). The middle check valve (CV2) permits flow of purge gas from the middle nozzle conduit (A10) into the middle nozzle (N2) while still permitting the density sensor (DT) to measure the pressure in the middle nozzle conduit (A10) and at the middle nozzle (N2). A middle porous element (PE2) is positioned on the middle nozzle conduit (A10) in between the middle manual valve (MV2) and the middle nozzle (N2). Preferably, the middle porous element (PE2) is positioned on the middle nozzle conduit (A10) at the interface between the middle nozzle conduit (A10) and the middle nozzle (N2) to prevent back-flow of bed material (105) and/or fluidization medium (106) into the middle nozzle conduit (A10).

A middle low-flow gas conduit (A08) is connected to the middle nozzle conduit (A10) in between the middle common port (V2C) and the middle nozzle (N2) via a middle connection (A08A). A middle low-flow gas conduit (A08) is connected to the purge gas supply header (A01). The middle low-flow gas conduit (A08) is configured to introduce a relatively lower flow of gas to the middle nozzle conduit (A10) when compared to the middle high-flow gas conduit (A09). During normal operation, a purge gas flows through the middle low-flow gas conduit (A08) and into the middle nozzle conduit (A10). The middle low-flow gas conduit (A08) is connected to the middle nozzle conduit (A10) via a middle connection (A08A). A middle flow sensor (F2A) is positioned on the middle nozzle low flow purge gas conduit (A08). A middle pressure sensor (P2A) is positioned on the middle low-flow gas conduit (A08) in between the middle flow sensor (F2A) and the middle connection (A08A).

The lower instrument port (V3A) is connected a LT/DT lower nozzle conduit (A07). The LT/DT lower nozzle conduit (A07) is connected at one end to the lower instrument port (V3A) and at another end to a first connection (A07A). The first connection (A07A) is connected to a high-pressure port (H2A) of the level sensor (LT), and to the high-pressure port (H3A) of the density sensor (DT). The lower purge port (V3B) is connected to a lower high-flow gas conduit (A03). The lower high-flow gas conduit (A03) is connected to the purge gas supply header (A01). The lower common port (V3C) is connected to a lower nozzle (N3) of the vessel (100) via a lower nozzle conduit (A05). A lower low-flow gas conduit (A02) is connected to the lower nozzle conduit (A05) in between the lower common port (V3C) and the lower nozzle (N3) via a lower connection (A02A).

A lower check valve (CV3) is positioned on the lower nozzle conduit (A05) in between the lower common port (V3C) and the lower nozzle (N3). A lower manual valve (MV3) is positioned on the lower nozzle conduit (A05) in between the lower check valve (CV3) and the lower nozzle (N3). The lower check valve (CV3) permits flow of purge gas from the lower nozzle conduit (A05) into the lower nozzle (N3) while still permitting the level sensor (LT), density sensor (DT), and fluidization grid differential pressure sensor (DP) to measure the pressure in the lower nozzle conduit (A05) and at the lower nozzle (N3). A lower porous element (PE3) is positioned on the lower nozzle conduit (A05) in between the lower manual valve (MV3) and the lower nozzle (N3). Preferably, the lower porous element (PE3) is positioned on the lower nozzle conduit (A05) at the interface between the lower nozzle conduit (A05) and the lower nozzle (N3) to prevent back-flow of bed material (105) and/or fluidization medium (106) into the lower nozzle conduit (A05). Each porous element (PE1, PE2, PE3) may have openings ranging from 0.25 microns to 100 microns. Additionally, each porous element (PE1, PE2, PE3) may be comprised of sintered metal.

A lower low-flow gas conduit (A02) is connected to the purge gas supply header (A01). The lower low-flow gas conduit (A02) is configured to introduce a relatively lower flow of gas to the lower nozzle conduit (A05) when compared to the lower high-flow gas conduit (A03). During normal operation, a purge gas flows through the lower low-flow gas conduit (A02) and into the lower nozzle conduit (A05). The lower low-flow gas conduit (A02) is connected to the lower nozzle conduit (A05) via a lower connection (A02A). A lower flow sensor (F3A) is positioned on the lower low-flow gas conduit (A02). A lower pressure sensor (P3A) is positioned on the lower low-flow gas conduit (A02) in between the lower flow sensor (F3A) and the lower connection (A02A). In embodiments, the gas flow through the flow sensors (F1A, F2A, F3A) may be on the order of 10 to 100 standard cubic feet per hour.

The system (1000) is configured to operate in a first mode of normal operation (Mode 1) in which: the upper nozzle valve (V1) has an open instrument port (V1A), a closed purge port (V1B), and an open common port (V1C); the middle nozzle valve (V2) has an open instrument port (V2A), a closed purge port (V2B), and an open common port (V2C); and the lower nozzle valve (V3) has an open instrument port (V3A), a closed purge port (V3B), and an open common port (V3C). This is depicted in FIG. 1 wherein the valves V1, V2, V3 are shown in with darkened-in valve ports V1B, V2B, and V3B which indicate the closed position. Further, relatively thicker line weights are attributed to FIG. 1 to indicate the flow-path that is available due to the specific positioning of the valving of embodiment of Mode 1. As a side note, relatively thicker line weights are attributed to the FIGS. 1, 2, 4, 5, 9, and 10 to indicate the flow-path that is available due to the specific positioning of the valving of the discussed embodiment.

A fluidization grid differential pressure sensor (DP) is provided to measure the pressure drop across the fluidization distribution grid (109). The fluidization grid differential pressure sensor (DP) is configured to output a signal (XDP) to the computer (COMP). The fluidization grid differential pressure sensor (DP) has a high-pressure port (H4A) and a low-pressure port (L4A). The high-pressure port (H4A) of the fluidization grid differential pressure sensor (DP) is connected to the fluidization medium supply conduit (107) via a DP fluidization grid inlet conduit (A06) and a fluidization medium supply conduit connection (A06A). The low-pressure port (L4A) of the fluidization grid differential pressure sensor (DP) is connected to the LT/DT lower nozzle conduit (A07) via a DP lower nozzle conduit (A04) and a connection (A04A). The difference in pressure between the third nozzle (N3) and the fluidization medium supply conduit (107) is the pressure drop across the fluidization distribution grid (109).

A freeboard pressure sensor (PT) is configured to measure the pressure difference between the freeboard zone (FB) within the interior (101) of the vessel (100) and atmospheric pressure (ATM) exterior to the vessel (100). The freeboard pressure sensor (PT) is configured to output a signal (XPT) to the computer (COMP). The freeboard pressure sensor (PT) has a high-pressure port (H1A) and a low-pressure port (L1A). The high-pressure port (H1A) of the freeboard pressure sensor (PT) is connected to the LT upper nozzle conduit (A13) via a PT upper nozzle conduit (A17) and a PT connection (A17A). The low-pressure port (L1A) of the freeboard pressure sensor (PT) is exposed to atmospheric pressure (ATM). The difference in pressure between the first nozzle (N1) and the atmospheric pressure (ATM) is the pressure within freeboard zone (FB) within the interior (101) of the vessel (100).

In embodiments, the present disclosure describes a method for calculating the height and the density of a fluidized bed (102) in a vessel (100), the vessel (100) having an interior (101), a top (103), a bottom (104), and a longitudinal axis (AX) extending along a height direction of the vessel (100), the vessel (100) further having a lower nozzle (N3) close to the bottom (104) and connected to a lower nozzle conduit (A05), an upper nozzle (N1) close to the top (103) and connected to an upper nozzle conduit (A15), and a middle nozzle (N2) positioned between the upper and lower nozzles and connected to a middle nozzle conduit (A10), the fluidized bed (102) having a bed height (L) that is between the upper nozzle (N1) and middle nozzle (N2), the method comprising:

(a) in a first mode of operation: (i) obtaining a first differential pressure (1DP) representative of a difference between a first pressure in the upper nozzle conduit (A15) and a third pressure in the lower nozzle conduit (A05); (ii) obtaining a second differential pressure (2DP) representative of a difference between a second pressure in the middle nozzle conduit (A10) and the third pressure in the lower nozzle conduit (A05); (iii) calculating a bed density (RHO) of the fluidized bed (102) based on the second differential pressure (2DP) and a height difference between the middle nozzle (N2) and the lower nozzle (N3); (iv) calculating a bed height (L) by dividing the first differential pressure (1DP) by the calculated bed density (RHO);

(b) in a second mode of operation: (i) purging the upper, lower, and middle nozzles (N1, N2, N3) by introducing a pressurized gas (A00) into the vessel's interior (101), via: the upper nozzle conduit (A15) and the upper nozzle (N1); the middle nozzle conduit (A10) and the middle nozzle (N2); and the lower nozzle conduit (A05) and the lower nozzle (N3).

In embodiments, the present disclosure provides: (i) an upper nozzle valve (V1) including: an upper instrument port (V1A) in fluid communication with a level sensor (LT) configured to measure a first pressure in the upper nozzle conduit (A15), an upper purge port (V1B) in fluid communication with a supply of pressurized gas (A00), and an upper common port (V1C) connected to the upper nozzle (N1) via an upper nozzle conduit (A15); (ii) a middle nozzle valve (V2) including: a middle instrument port (V2A) in fluid communication with a density sensor (DT) configured to measure a second pressure in the middle nozzle conduit (A10), a middle purge port (V2B) in fluid communication with a supply of pressurized gas (A00), and a middle common port (V2C) connected to the middle nozzle (N2) via a middle nozzle conduit (A10); and (iii) a lower nozzle valve (V3) including: a lower instrument port (V3A) in fluid communication with both the level sensor (LT) and density sensor (DT) and configured to measure a third pressure in the lower nozzle conduit (A05), a lower purge port (V3B) in fluid communication with a supply of pressurized gas (A00), and a lower common port (V3C) connected to the lower nozzle (N3) via a lower nozzle conduit (A05); wherein:

(a) in a first mode of operation: (a1) the level sensor (LT) measures the first pressure in the upper nozzle conduit (A15) through the upper instrument port (V1A) and the upper common port (V1C) of the upper nozzle valve (V1), (a2) the density sensor (DT) measures the second pressure in the middle nozzle conduit (A10) through the middle instrument port (V2A) and the middle common port (V2C) of the middle nozzle valve (V2), and (a3) the level sensor (LT) and density sensor (DT) measure the third pressure in the lower nozzle conduit (A05) through the lower instrument port (V3A) and the lower common port (V3C) of the lower nozzle valve (V3); and (b) in a second mode of operation: (b1) purging the upper nozzle (N1) by passing pressurized gas (A00) through the upper purge port (V1B) to the upper common port (V1C) of the upper nozzle valve (V1) and into the upper nozzle conduit (A15) and the upper nozzle (N1), (b2) purging the middle nozzle (N2) by passing pressurized gas (A00) through the middle purge port (V2B) to the middle common port (V2C) of the middle nozzle valve (V2) and into the middle nozzle conduit (A10) and the middle nozzle (N2), and (b3) purging the lower nozzle (N3) by passing pressurized gas (A00) through the lower purge port (V3B) to the lower common port (V3C) of the lower nozzle valve (V3) and into the lower nozzle conduit (A05) and the lower nozzle (N3).

In embodiments, the present disclosure describes that in the second mode of operation: (i) suspending measurement of the first differential pressure (1DP) between the upper nozzle (N1) and lower nozzle (N3) while simultaneously introducing a pressurized gas (A00) to purge the upper nozzle (N1) and lower nozzle (N3); and, (ii) suspending measurement of the second differential pressure (2DP) between the middle nozzle (N2) and the lower nozzle (N3) while simultaneously introducing a pressurized gas (A00) to purge the middle nozzle (N2) and the lower nozzle (N3).

In embodiments, the present disclosure describes that the vessel (100) is equipped with a fluidization distribution grid (109) positioned within the vessel's interior (101), the vessel (100) is equipped with a fluidization medium input (108) connected to a fluidization medium supply conduit (107) that is configured to supply a fluidization medium (106) to the fluidization distribution grid (109), and a fluidization grid differential pressure sensor (DP) is configured to measure the pressure difference between the fluidization medium supply conduit (107) and in the lower nozzle (N3); in the first mode of operation: (i) the fluidization grid differential pressure sensor (DP) measures the pressure across the fluidization distribution grid (109) via the lower nozzle (N3) and fluidization medium supply conduit (107); and in the second mode of operation: (i) a pressurized gas is (A00) introduced into the vessel's interior (101) via the lower nozzle (N3).

FIG. 2

Figure 2:
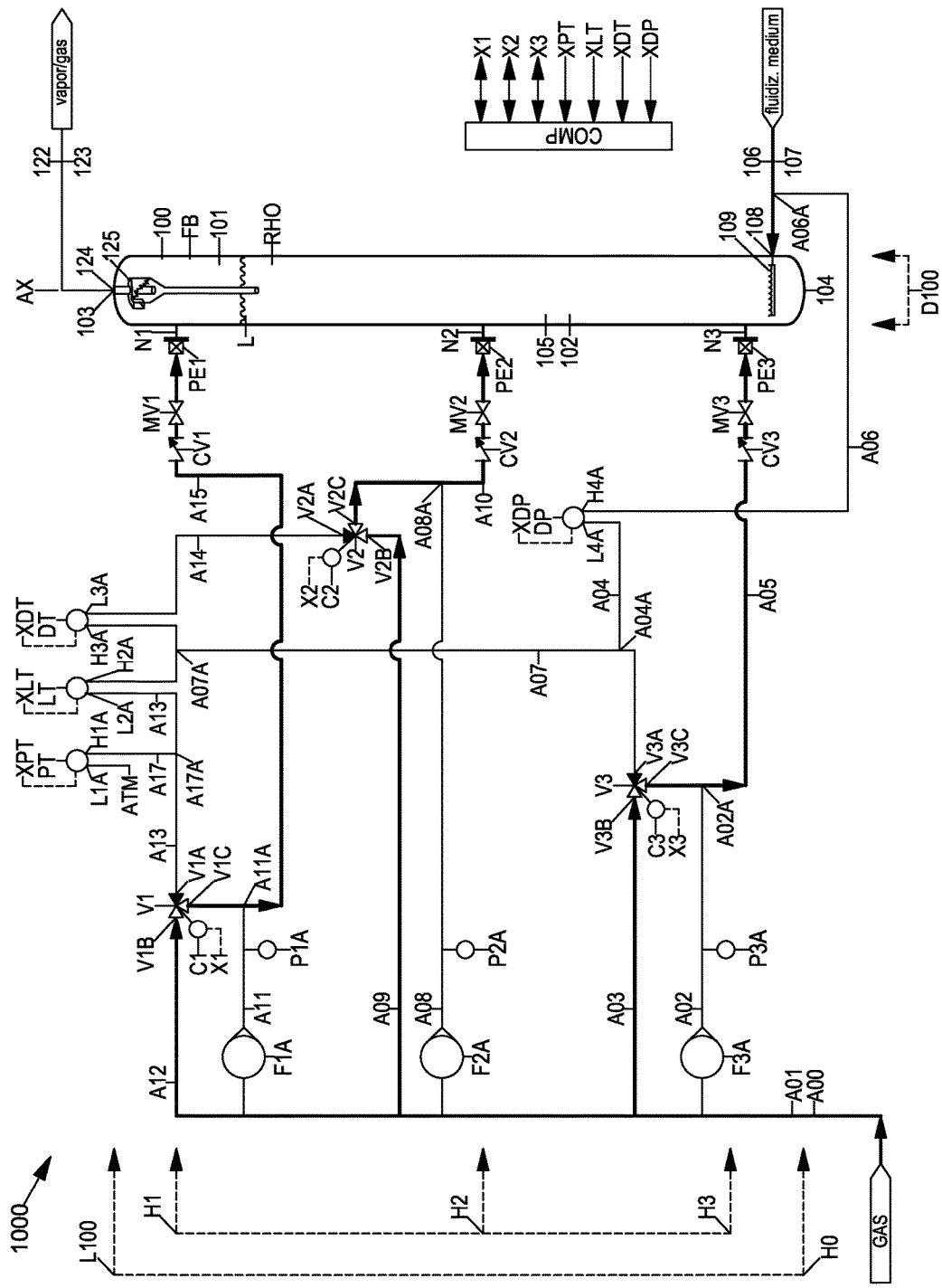
FIG. 2 depicts one non-limiting embodiment of an automated level and density measurement system (1000) including a vessel (100) equipped with a freeboard pressure sensor (PT), level sensor (LT), density sensor (DT), and a fluidization grid differential pressure sensor (DP) shown in a second mode of operation (Mode 2) under gas purge conditions.

FIG. 2 depicts one non-limiting embodiment of an automated level and density measurement system (1000) including a vessel (100) equipped with a freeboard pressure sensor (PT), level sensor (LT), density sensor (DT), and a fluidization grid differential pressure sensor (DP) shown in a second mode of operation (Mode 2) under gas purge conditions.

As shown in FIG. 2, the system (1000) is configured to operate in a second mode of purge operation (Mode 2) in which: the upper nozzle valve (V1) has a closed instrument port (V1A), an open purge port (V1B), and an open common port (V1C); the middle nozzle valve (V2) has a closed instrument port (V2A), an open purge port (V2B), and an open common port (V2C); and the lower nozzle valve (V3) has a closed instrument port (V3A), an open purge port (V3B), and an open common port (V3C). Mode 2 is depicted in FIG. 2 wherein the valves V1, V2, V3 are shown in with darkened-in valve ports V1A, V2A, and V3A which indicate the closed position. Further, relatively thicker line weights are attributed to FIG. 2 to indicate the flow-path that is available due to the specific positioning of the valving of embodiment of Mode 2.

FIG. 3

FIG. 3 discloses the valve states for automated controller operation of the non-limiting embodiments shown in FIGS. 1 and 2.

FIG. 4

Figure 4:
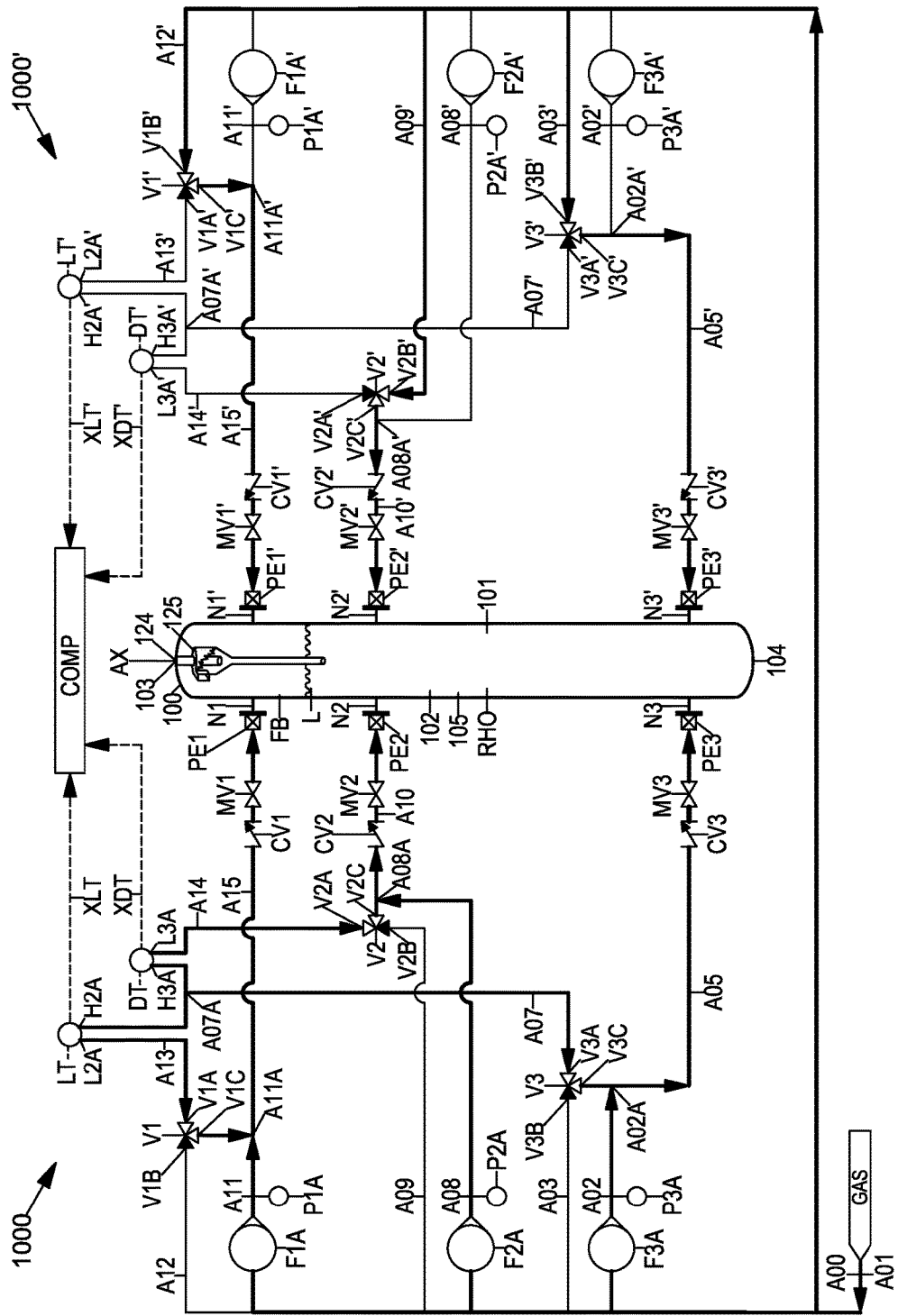
FIG. 4 depicts the embodiments of FIGS. 1 and 2 wherein one vessel (100) has a plurality of automated level and density measurement systems (1000, 1000') each equipped to independently measure density and level of the fluidized bed (102) within the vessel (100) via independent upper nozzles (N1, N1'), middle nozzles (N2, N2'), and lower nozzles (N3, N3') wherein the first system (1000) is shown in a first mode of operation under normal operating conditions and the second system (1000') is shown in a second mode of operation under gas purge conditions.

FIG. 4 depicts the embodiments of FIGS. 1 and 2 wherein one vessel (100) has a plurality of automated level and density measurement systems (1000, 1000') each equipped to independently measure density and level of the fluidized bed (102) within the vessel (100) via independent upper nozzles (N1, N1'), middle nozzles (N2, N2'), and lower nozzles (N3, N3') wherein the first system (1000) is shown in a first mode of operation under normal operating conditions and the second system (1000') is shown in a second mode of operation under gas purge conditions.

As depicted in FIG. 4, the left-hand-side of the vessel (100) is the first automated level and density measurement system (1000) and the right-hand-side of the vessel (100) is the second automated level and density measurement system (1000'). The system (1000) as described in FIG. 1 is shown in the left-hand-side of FIG. 4 and the second system (1000') is duplicated and mirrored on the right-hand-side of FIG. 4. Each system (1000, 1000') includes assets that are identical to the other and function similarly although not in the same manner since FIG. 4 shows the first system (1000) in Mode 1 operating under normal conditions and the second system (1000') in Mode 2 operating under purge conditions. Each system (1000, 1000') includes its own level sensor (LT, LT') and density sensor (DT, DT') that is connected to the vessel (100) independently by its own set of separate upper nozzles (N1, N1'), middle nozzles (N2, N2'), and lower nozzles (N3, N3').

The second automated level and density measurement system (1000') includes: (a) an upper nozzle valve (V1') including an upper instrument port (V1A'), an upper purge port (V1B'), and an upper common port (V1C'), the upper common port (V1C') is always open and only one of the upper instrument port (V1A') and upper purge port (V1B') are open at any time; (b) a middle nozzle valve (V2') including a middle instrument port (V2A'), a middle purge port (V2B'), and a middle common port (V2C'), the middle common port (V2C') is always open and only one of the middle instrument port (V2A') and middle port (V2B') are open at any time; and (c) a lower nozzle valve (V3') including a lower instrument port (V3A'), a lower purge port (V3B'), and a lower common port (V3C'), the lower common port (V3C') is always open and only one of the lower instrument port (V3A') and lower port (V3B') are open at any time.

The upper instrument port (V1A') is connected to the low-pressure port (L2A') of a level sensor (LT') via a LT upper nozzle conduit (A13'). The level sensor (LT') is configured to obtain a secondary first differential pressure (1DPB) representative of a difference between a first pressure at the second upper nozzle (N1') and a third pressure at the second lower nozzle (N3'). The level sensor (LT') is configured to obtain a secondary first differential pressure (1DPB) representative of a difference between a first pressure in the upper nozzle conduit (A15') and a third pressure in the lower nozzle conduit (A05').

The upper purge port (V1B') is connected to an upper high-flow gas conduit (A12'). The upper common port (V1C') is connected to a second upper nozzle (N1') of a vessel (100) via an upper nozzle conduit (A15'). The upper high-flow gas conduit (A12') is connected to a purge gas supply header (A01).

An upper check valve (CV1') is positioned on the upper nozzle conduit (A15') in between the upper common port (V1C') and the second upper nozzle (N1'). An upper manual valve (MV1') is positioned on the upper nozzle conduit (A15') in between the upper check valve (CV1') and the second upper nozzle (N1'). The upper check valve (CV1') permits flow of purge gas from the upper nozzle conduit (A15') into the second upper nozzle (N1') while still permitting the level sensor (LT') to measure the pressure in the upper nozzle conduit (A15') and at the second upper nozzle (N1'). An upper porous element (PE1') is positioned on the second upper nozzle conduit (A15') in between the upper manual valve (MV1') and the second upper nozzle (N1'). Preferably, the upper porous element (PE1') is positioned on the upper nozzle conduit (A15') at the interface between the upper nozzle conduit (A15') and the second upper nozzle (N1') to prevent back-flow of bed material (105) and/or fluidization medium (106) into the upper nozzle conduit (A15').

An upper low-flow gas conduit (A11') is connected to the upper nozzle conduit (A15') in between the upper common port (V1C') and the second upper nozzle (N1') via an upper connection (A11A'). An upper low-flow gas conduit (A11') is connected to the purge gas supply header (A01). The upper low-flow gas conduit (A11') is configured to introduce a relatively lower flow of gas to the upper nozzle conduit (A15') when compared to the upper high-flow gas conduit (A12'). During normal operation (not shown in FIG. 4 for the second system 1000'), a purge gas flows through the upper low-flow gas conduit (A11') and into the upper nozzle conduit (A15'). The upper low-flow gas conduit (A11') is connected to the upper nozzle conduit (A15') via an upper connection (A11A'). An upper flow sensor (F1A') is positioned on the upper low-flow gas conduit (A11'). An upper pressure sensor (P1A') is positioned on the upper low-flow gas conduit (A11') in between the upper flow sensor (F1A') and the upper connection (A11A').

The middle instrument port (V2A') is connected to the low-pressure port (L3A') of a density sensor (DT') via a DT middle nozzle conduit (A14'). The density sensor (DT') is configured to obtain a secondary second differential pressure (2DPB) representative of a difference between a second pressure at the second middle nozzle (N2') and a third pressure at the second lower nozzle (N3'). The density sensor (DT') is configured to obtain a secondary second differential pressure (2DPB) representative of a difference between a second pressure in the middle nozzle conduit (A10') and the third pressure in the lower nozzle conduit (A05').

The middle purge port (V2B') is connected to a middle high-flow gas conduit (A09'). The middle common port (V2C') is connected to a second middle nozzle (N2') of the vessel (100) via a middle nozzle conduit (A10'). A middle check valve (CV2') is positioned on the middle nozzle conduit (A10') in between the middle common port (V2C') and the second middle nozzle (N2'). A middle manual valve (MV2') is positioned on the middle nozzle conduit (A10') in between the middle check valve (CV2') and the second middle nozzle (N2'). The middle check valve (CV2') permits flow of purge gas from the middle nozzle conduit (A10') into the second middle nozzle (N2') while still permitting the density sensor (DT') to measure the pressure in the middle nozzle conduit (A10') and at the second middle nozzle (N2'). A middle porous element (PE2') is positioned on the middle nozzle conduit (A10') in between the middle manual valve (MV2') and the second middle nozzle (N2'). Preferably, the middle porous element (PE2') is positioned on the middle nozzle conduit (A10') at the interface between the middle nozzle conduit (A10') and the second middle nozzle (N2') to prevent back-flow of bed material (105) and/or fluidization medium (106) into the middle nozzle conduit (A10').

A middle low-flow gas conduit (A08') is connected to the middle nozzle conduit (A10') in between the middle common port (V2C') and the second middle nozzle (N2') via a middle connection (A08A'). A middle low-flow gas conduit (A08') is connected to the purge gas supply header (A01). The middle low-flow gas conduit (A08') is configured to introduce a relatively lower flow of gas to the middle nozzle conduit (A10') when compared to the middle high-flow gas conduit (A09'). During normal operation, a purge gas flows through the middle low-flow gas conduit (A08') and into the middle nozzle conduit (A10'). The middle low-flow gas conduit (A08') is connected to the middle nozzle conduit (A10') via a middle connection (A08A'). A middle flow sensor (F2A') is positioned on the middle nozzle low flow purge gas conduit (A08'). A middle pressure sensor (P2A') is positioned on the middle low-flow gas conduit (A08') in between the middle flow sensor (F2A') and the middle connection (A08A').

The lower instrument port (V3A') is connected a LT/DT lower nozzle conduit (A07'). The LT/DT lower nozzle conduit (A07') is connected at one end to the lower instrument port (V3A') and at another end to a first connection (A07A'). The first connection (A07A') is connected to a high-pressure port (H2A') of the level sensor (LT'), and to the high-pressure port (H3A') of the density sensor (DT'). The lower purge port (V3B') is connected to a lower high-flow gas conduit (A03'). The lower common port (V3C') is connected to a second lower nozzle (N3') of the vessel (100) via a lower nozzle conduit (A05'). A lower low-flow gas conduit (A02') is connected to the lower nozzle conduit (A05') in between the lower common port (V3C') and the second lower nozzle (N3') via a lower connection (A02A').

A lower check valve (CV3') is positioned on the lower nozzle conduit (A05') in between the lower common port (V3C') and the second lower nozzle (N3'). A lower manual valve (MV3') is positioned on the lower nozzle conduit (A05') in between the lower check valve (CV3') and the second lower nozzle (N3'). The lower check valve (CV3') permits flow of purge gas from the lower nozzle conduit (A05') into the second lower nozzle (N3') while still permitting the level sensor (LT') and density sensor (DT') to measure the pressure in the lower nozzle conduit (A05') and at the second lower nozzle (N3'). A lower porous element (PE3') is positioned on the lower nozzle conduit (A05') in between the lower manual valve (MV3') and the second lower nozzle (N3'). Preferably, the lower porous element (PE3') is positioned on the lower nozzle conduit (A05') at the interface between the lower nozzle conduit (A05') and the second lower nozzle (N3') to prevent back-flow of bed material (105) and/or fluidization medium (106) into the lower nozzle conduit (A05'). Each porous element (PE1', PE2', PE3') may have openings ranging from 0.25 microns to 100 microns. Additionally, each porous element (PE1', PE2', PE3') may be comprised of sintered metal.

A lower low-flow gas conduit (A02') is connected to the purge gas supply header (A01). The lower low-flow gas conduit (A02') is configured to introduce a relatively lower flow of gas to the lower nozzle conduit (A05') when compared to the lower high-flow gas conduit (A03'). During normal operation, a purge gas flows through the lower low-flow gas conduit (A02') and into the lower nozzle conduit (A05'). The lower low-flow gas conduit (A02') is connected to the lower nozzle conduit (A05') via a lower connection (A02A'). A lower flow sensor (F3A') is positioned on the lower low-flow gas conduit (A02'). A lower pressure sensor (P3A') is positioned on the lower low-flow gas conduit (A02') in between the lower flow sensor (F3A') and the lower connection (A02A'). In embodiments, the gas flow through the flow sensors (F1A', F2A', F3A') may be on the order of 10 to 100 standard cubic feet per hour.

As shown in FIG. 4, the first system (1000) is configured to operate in a first mode of normal operation (Mode 1) in which: the upper nozzle valve (V1) has an open instrument port (V1A), a closed purge port (V1B), and an open common port (V1C); the middle nozzle valve (V2) has an open instrument port (V2A), a closed purge port (V2B), and an open common port (V2C); and the lower nozzle valve (V3) has an open instrument port (V3A), a closed purge port (V3B), and an open common port (V3C). This is depicted in FIG. 4 wherein the valves V1, V2, V3 are shown in with darkened-in valve ports V1B, V2B, and V3B which indicate the closed position. Further, relatively thicker line weights are attributed to FIG. 4 to indicate the flow-path that is available due to the specific positioning of the valving of embodiment of the first system (1000) in Mode 1 on the left-hand-side and the second system (1000') in Mode 2 on the right-hand-side.

As shown in FIG. 4, the second system (1000') is configured to operate in a second mode of purge operation (Mode 2) in which: the upper nozzle valve (V1') has a closed instrument port (V1A'), an open purge port (V1B'), and an open common port (V1C'); the middle nozzle valve (V2') has a closed instrument port (V2A'), an open purge port (V2B'), and an open common port (V2C'); and the lower nozzle valve (V3') has a closed instrument port (V3A'), an open purge port (V3B'), and an open common port (V3C'). This is depicted in FIG. 4 wherein the valves V1, V2, V3 are shown in with darkened-in valve ports V1A, V2A, and V3A which indicate the closed position.

FIG. 5

Figure 5:
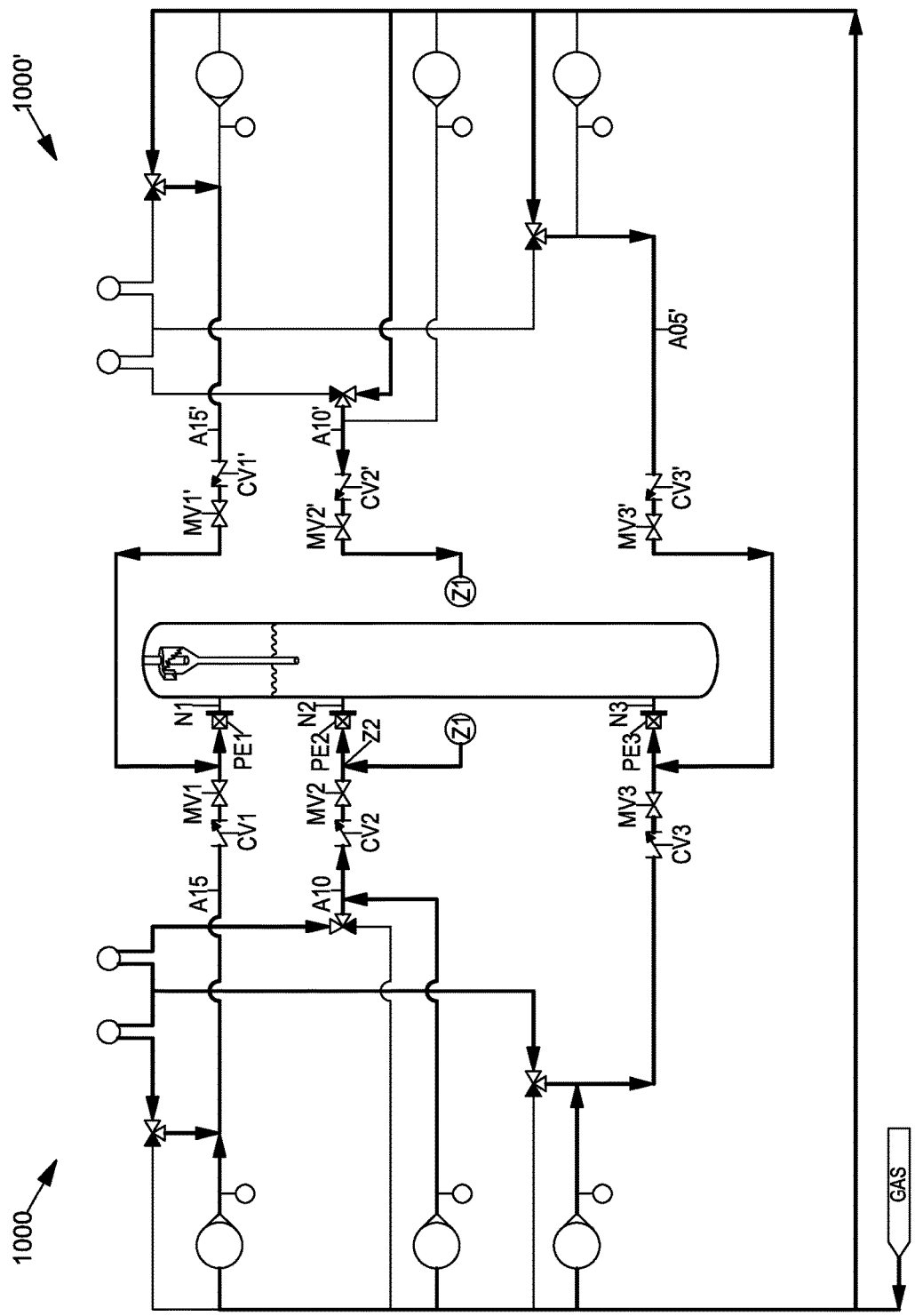
FIG. 5 depicts the embodiments of FIGS. 1 and 2 wherein one vessel (100) has a plurality of automated level and density measurement systems (1000, 1000') each equipped to independently measure density and level of the fluidized bed (102) within the vessel (100) while sharing an upper nozzle (N1), middle nozzle (N2), and lower nozzle (N3).

FIG. 5 depicts the embodiments of FIGS. 1 and 2 wherein one vessel (100) has a plurality of automated level and density measurement systems (1000, 1000') each equipped to independently measure density and level of the fluidized bed (102) within the vessel (100) while sharing an upper nozzle (N1), middle nozzle (N2), and lower nozzle (N3).

Similar to FIG. 4, FIG. 5 shown the left-hand-side of the vessel (100) having a first automated level and density measurement system (1000) and the right-hand-side of the vessel (100) having a second automated level and density measurement system (1000'). Each system includes assets that are identical to the other and function similarly although not in the same manner similar to FIG. 4. Each system (1000, 1000') includes its own level sensor (LT, LT') and density sensor (DT, DT') that is connected to the vessel (100) by only one upper nozzle (N1), middle nozzle (N2), and lower nozzle (N3).

FIG. 5 shows the middle nozzle conduit (A10') of the second system (1000') to be connected with the middle nozzle conduit (A10') of the first system (1000) via a connection (Z2). A connector (Z1) is shown in FIG. 5 to illustrate the continuity of the middle nozzle conduit (A10') of the second system (1000').

FIG. 6

Figure 6:
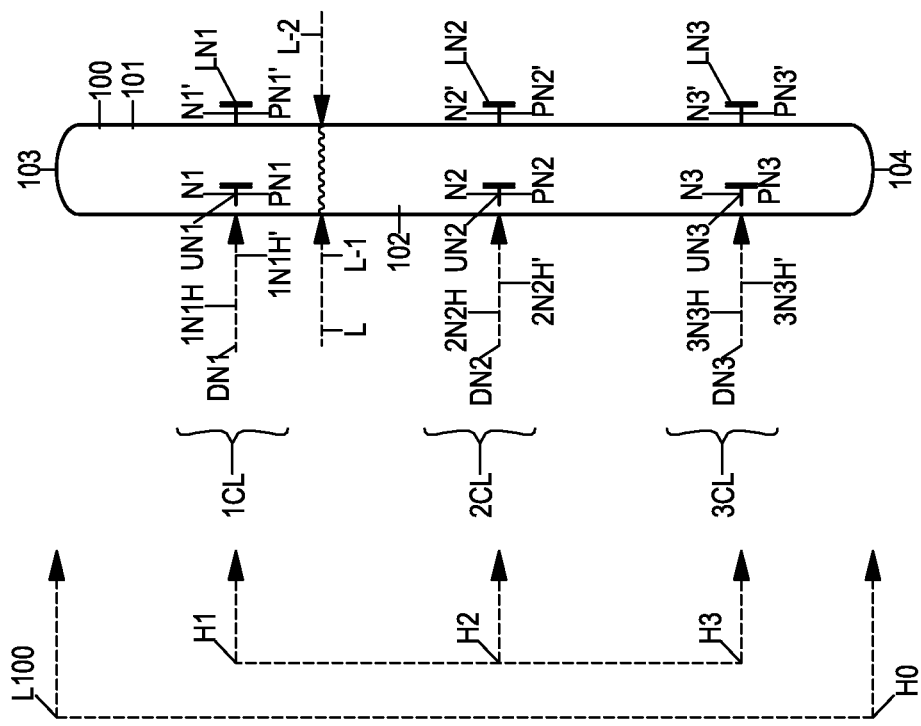
FIG. 6 depicts one non-limiting embodiment where first and second upper nozzles (N1, N1'), first and second middle nozzles (N2, N2'), and first and second lower nozzles (N3, N3'), are organized into three vertically spaced-apart clusters: a first, upper cluster (1CL); a second, middle cluster (2CL); and a third, lower cluster (3CL).

FIG. 6 depicts one non-limiting embodiment where first and second upper nozzles (N1, N1'), first and second middle nozzles (N2, N2'), and first and second lower nozzles (N3, N3'), are organized into three vertically spaced-apart clusters: a first, upper cluster (1CL); a second, middle cluster (2CL); and a third, lower cluster (3CL).

In the embodiment shown in FIG. 6, each cluster (1CL, 2CL, 3CL) includes more than one nozzle (N1, N1', N2, N2', N3, N3') which may be located at the same height along the height (L100) of the vessel (100). In other embodiments, each cluster (1CL, 2CL, 3CL) includes more than one nozzle (N1, N1', N2, N2', N3, N3') which may not be located at the same height along the height (L100) of the vessel (100).

As seen in the embodiment of FIG. 6, the upper nozzles (N1, N1') belong to the upper cluster (1CL) and are arranged at the same upper nozzle height (H1). The first upper nozzle (N1) is located at a first upper nozzle height (1N1H). The second upper nozzle (N1') is located at a second upper nozzle height (1N1H'). In the embodiment shown, the first upper nozzle height (1N1H) is equal to the second upper nozzle height (1N1H'). The upper vertical extent (DN1) is the difference in height between the first upper nozzle (N1) at the first upper nozzle height (1N1H) and the second upper nozzle (N1') at the second upper nozzle height (1N1H'). Since the upper nozzles (N1, N1') are located at the same height, the first and second upper nozzles (N1, N1') serve as both the uppermost upper nozzle (UN1) and the lowermost upper nozzle (LN1). Here, the first upper nozzle (N1) has a first upper pressure (PN1), and the second upper nozzle (N1') has a second upper pressure (PN1'). Since the first upper nozzle (N1) is not positioned higher or lower on the vessel (100) than the second upper nozzle (N1'), the first upper nozzle (N1) has a first upper pressure (PN1) that is equal to the second upper pressure (PN1').

As seen in the embodiment of FIG. 6, the middle nozzles (N2, N2') belong to the middle cluster (2CL) and are arranged at the same middle nozzle height (H2). The first middle nozzle (N2) is located at a first middle nozzle height (2N2H). The second middle nozzle (N2') is located at a second middle nozzle height (2N2H'). In the embodiment shown, the first middle nozzle height (2N2H) is equal to the second middle nozzle height (2N2H'). The middle vertical extent (DN2) is the difference in height between the first middle nozzle (N2) at the first middle nozzle height (2N2H) and the second middle nozzle (N2') at the second middle nozzle height (2N2H'). Since the middle nozzles (N2, N2') are located at the same height, the first and second middle nozzles (N2, N2') serve as both the uppermost middle nozzle (UN2) and the lowermost middle nozzle (LN2). Here, the first middle nozzle (N2) has a first middle pressure (PN2), and the second middle nozzle (N2') has a second middle pressure (PN2'). Since the first middle nozzle (N2) is not positioned higher or lower on the vessel (100) than the second middle nozzle (N2'), the first middle nozzle (N2) has a first middle pressure (PN2) that is equal to the second middle pressure (PN2').

As seen in the embodiment of FIG. 6, the lower nozzles (N3, N3') belong to the lower cluster (3CL) and are arranged at the same lower nozzle height (H3). The first lower nozzle (N3) is located at a first lower nozzle height (3N3H). The second lower nozzle (N3') is located at a second lower nozzle height (3N3H'). In the embodiment shown, the first lower nozzle height (3N3H) is equal to the second lower nozzle height (3N3H'). The lower vertical extent (DN3) is the difference in height between the first lower nozzle (N3) at the first lower nozzle height (3N3H) and the second lower nozzle (N3') at the second lower nozzle height (3N3H'). Since the lower nozzles (N3, N3') are located at the same height, the first and second lower nozzles (N3, N3') serve as both the uppermost lower nozzle (UN3) and the lowermost lower nozzle (LN3). Here, the first lower nozzle (N3) has a first lower pressure (PN3), and the second lower nozzle (N3') has a second lower pressure (PN3'). Since the first lower nozzle (N3) is not positioned higher or lower on the vessel (100) than the second lower nozzle (N3'), the first lower nozzle (N3) has a first lower pressure (PN3) that is equal to the second lower pressure (PN3').

In embodiments, the present disclosure describes that the vessel (100) has a plurality of upper nozzles (N1, N1'), a plurality of middle nozzles (N2, N2'), and a plurality of lower nozzles (N3, N3') that are organized into three vertically spaced-apart clusters (1CL, 2CL, 3CL), a first upper cluster (1CL) including the plurality of upper nozzles (N1, N1'), a second middle cluster (2CL) including a plurality of middle nozzles (N2, N2'), and a third lower cluster (3CL) including the plurality of lower nozzles (N3, N3'), the lower cluster (3CL) is close to the bottom (104), the upper cluster (1CL) is close to the top (103), and the middle cluster (2CL) positioned between the upper and lower clusters (1CL, 3CL), the fluidized bed (102) having a bed height (L) that is between the upper cluster (1CL) and the middle cluster (2CL); in the first mode of operation: (i) obtaining a first differential pressure (1DP) that is representative of an average difference in pressures between a first cluster (1CL) and a third cluster (3CL); (ii) obtaining a second differential pressure (2DP) that is representative of an average difference in pressures between a second cluster (2CL) and the third cluster (3CL); (iii) calculating a bed density (RHO) of the fluidized bed (102) based on the second differential pressure (2DP) and at least one height difference between at least one middle nozzle (N2, N2') and at least one the lower nozzle (N3, N3'); (iv) calculating a bed height (L) by dividing the first differential pressure (1DP) by the calculated bed density (RHO); in the second mode of operation: (i) the pressurized gas (A00) is introduced into the vessel's interior (101), via the pluralities of upper, middle, and lower nozzles (N1, N1', N2, N2', N3, N3').

In embodiments, the present disclosure describes that the vessel (100) has a plurality of lower nozzles (N3, N3') close to the bottom (104), a plurality of upper nozzles (N1, N1') close to the top (103), and a plurality of middle nozzles (N2, N2') positioned between the upper and lower nozzles (N1, N1', N3, N3'), both upper nozzles (N1, N1') are located at the same upper nozzle height (H1), both middle nozzles (N2, N2') are located at the same middle nozzle height (H2), both lower nozzles (N3, N3') are located at the same lower nozzle height (H3), the fluidized bed (102) having a bed height (L) that is between the upper nozzles (N1, N1') and middle nozzles (N2, N2');

in the first mode of operation:

(i) obtaining a first differential pressure (1DP) that is representative of the difference in pressure between the first upper nozzle (N1) and a first lower nozzle (N3);

(ii) obtaining a secondary first differential pressure (1DPB) is representative of the difference in pressure between the second upper nozzle (N1') and a second lower nozzle (N3');

(iii) obtaining a second differential pressure (2DP) that is representative of the difference in pressure between a first middle nozzle (N2) and a first lower nozzle (N3);

(iv) obtaining a secondary second differential pressure (2DPB) that is representative of the difference in pressure between a second middle nozzle (N2') and a second lower nozzle (N3');

(v) calculating a first bed density (RHO-1) of the fluidized bed (102) based on the second differential pressure (2DP) and the height between the first middle nozzle (N2) and a first lower nozzle (N3);

(vi) calculating a second bed density (RHO-2) of the fluidized bed (102) based on the secondary second differential pressure (2DPB) and the height between the second middle nozzle (N2') and a second lower nozzle (N3');

(vii) calculating a first bed height (L-1) by dividing the first differential pressure (1DP) by the first bed density (RHO-1);

(viii) calculating a second bed height (L-2) by dividing the secondary first differential pressure (1DPB) by the second bed density (RHO-2);

(ix) calculating an average bed height (L) by averaging the first bed height (L-1) and the second bed height (L-2);

in the second mode of operation:

(i) the pressurized gas (A00) is introduced into the vessel's interior (101), via the pluralities of upper, middle, and lower nozzles (N1, N1', N2, N2', N3, N3').

Figure 7:
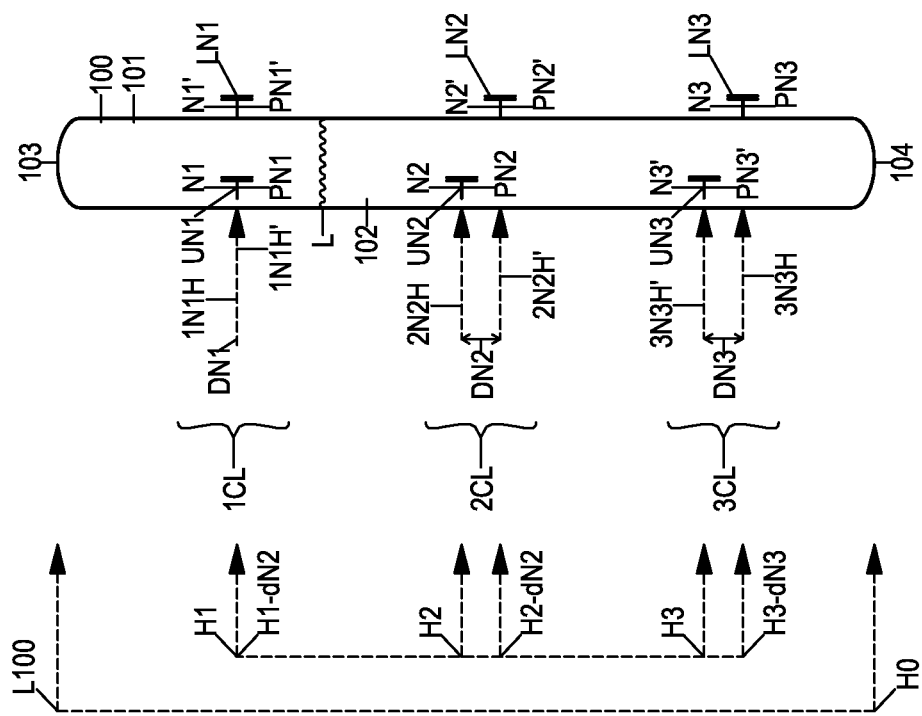
FIG. 7 depicts a non-limiting embodiment of FIG. 6 where a first middle nozzle (N2) has a first middle nozzle height (2N2H) that is located above the second middle nozzle (N2') at a second middle nozzle height (2N2H') and the first lower nozzle (N3) has a first lower nozzle height (3N3H) that is located above the second lower nozzle (N3') at a second lower nozzle height (3N3H').

In embodiments, the present disclosure describes that the vessel (100) has a plurality of lower nozzles (N3, N3') close to the bottom (104), one upper nozzle (N1) close to the top (103), and a plurality of middle nozzles (N2, N2') positioned between the upper nozzle (N1) and lower nozzles (N3, N3'), the upper nozzle (N1) is located an upper nozzle height (H1), both middle nozzles (N2, N2') are located at the same middle nozzle height (H2), both lower nozzles (N3, N3') are located at the same lower nozzle height (H3), the fluidized bed (102) having a bed height (L) that is between the upper nozzle (N1) and middle nozzles (N2, N2');

in the first mode of operation:

(i) obtaining a first differential pressure (1DP) that is representative of the difference in pressure between the upper nozzle (N1) and a first lower nozzle (N3);

(ii) obtaining a second differential pressure (2DP) that is representative of the difference in pressure between a first middle nozzle (N2) and a first lower nozzle (N3);

(iii) obtaining a secondary second differential pressure (2DPB) that is representative of the difference in pressure between a second middle nozzle (N2') and a second lower nozzle (N3');

(iv) calculating a first bed density (RHO-1) of the fluidized bed (102) based on the second differential pressure (2DP) and the height between the first middle nozzle (N2) and a first lower nozzle (N3);

(v) calculating a second bed density (RHO-2) of the fluidized bed (102) based on the secondary second differential pressure (2DPB) and the height between the second middle nozzle (N2') and a second lower nozzle (N3');

(vi) calculating an average bed density (RHO) by averaging the first bed density (RHO-1) and the second bed density (RHO-2);

(vii) calculating a bed height (L) by dividing the first differential pressure (1DP) by the average bed density (RHO);

in the second mode of operation:

(i) the pressurized gas is (A00) introduced into the vessel's interior (101), via the upper nozzle (N1) and pluralities of middle and lower (N2, N2', N3, N3').
FIG. 7

FIG. 7 depicts a non-limiting embodiment of FIG. 6 where a first middle nozzle (N2) has a first middle nozzle height (2N2H) that is located above the second middle nozzle (N2') at a second middle nozzle height (2N2H') and the first lower nozzle (N3) has a first lower nozzle height (3N3H) that is located above the second lower nozzle (N3') at a second lower nozzle height (3N3H').

As seen in the embodiment of FIG. 7, the upper nozzles (N1, N1') belong to the upper cluster (1CL) and are arranged at the same height. FIG. 7 shows the first middle nozzle (N2) located at a first middle nozzle height (2N2H), and the second middle nozzle (N2') is located at a second middle nozzle height (2N2H'). In the embodiment shown, the first middle nozzle height (2N2H) is positioned higher on the vessel (100) than the second middle nozzle height (2N2H'). In the embodiment shown, the first middle nozzle (N2) serves as the uppermost middle nozzle (UN2) and the second middle nozzle (N2') serves as the lowermost middle nozzle (LN2). The middle vertical extent (DN2) is the difference in height between the first middle nozzle (N2) at the first middle nozzle height (2N2H) and the second middle nozzle (N2') at the second middle nozzle height (2N2H'). Or the middle vertical extent (DN2) is the difference in height between the uppermost middle nozzle (UN2) and the lowermost middle nozzle (LN2). Here, the first middle nozzle (N2) has a first middle pressure (PN2), and the second middle nozzle (N2') has a second middle pressure (PN2'). Since the first middle nozzle (N2) is positioned higher on the vessel (100) than the second middle nozzle (N2'), the first middle nozzle (N2) has a first middle pressure (PN2) that is less than second middle nozzle (N2'). The first middle pressure (PN2) is less than the second middle pressure (PN2').

FIG. 7 shows the first lower nozzle (N3) located at a first lower nozzle height (3N3H), and the second lower nozzle (N3') located at a second lower nozzle height (3N3H'). The first lower nozzle height (3N3H) is positioned lower on the vessel (100) than the second lower nozzle height (3N3H'). In the embodiment shown in FIG. 8, the first lower nozzle (N3) serves as the lowermost lower nozzle (LN3) and the second lower nozzle (N3') serves as the uppermost lower nozzle (UN3). The lower vertical extent (DN3) is the difference in height between the first lower nozzle (N3) at the first lower nozzle height (3N3H) and the second lower nozzle (N3') at the second lower nozzle height (3N3H'). Or the lower vertical extent (DN3) is the difference in height between the uppermost lower nozzle (UN3) and the lowermost lower nozzle (LN3). Here, the first lower nozzle (N3) has a first lower pressure (PN3), and the second lower nozzle (N3') has a second lower pressure (PN3'). Since the first lower nozzle (N3) is positioned lower on the vessel (100) than the second lower nozzle (N3'), the first lower nozzle (N3) has a first lower pressure (PN3) that is greater than second lower nozzle (N3').

In embodiments, the present disclosure describes that the vessel (100) has a plurality of lower nozzles (N3, N3') close to the bottom (104), a plurality of upper nozzles (N1, N1') close to the top (103), and a plurality of middle nozzles (N2, N2') positioned between the upper and lower nozzles (N1, N1', N3, N3'), both upper nozzles (N1, N1') are located at the same upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), the fluidized bed (102) having a bed height (L) that is between the upper nozzles (N1, N1') and uppermost middle nozzle (UN2);

in the first mode of operation:

(i) obtaining a first differential pressure (1DP) that is representative of the difference in pressure between the first upper nozzle (N1) and a lowermost lower nozzle (LN3);

(ii) obtaining a secondary first differential pressure (1DPB) is representative of the difference in pressure between the second upper nozzle (N1') and a lowermost lower nozzle (LN3);

(iii) obtaining a second differential pressure (2DP) that is representative of the difference in pressure between an uppermost middle nozzle (UN2) and an uppermost lower nozzle (UN3);

(iv) obtaining a secondary second differential pressure (2DPB) that is representative of the difference in pressure between a lowermost middle nozzle (LN2) and a lowermost lower nozzle (LN3);

(v) calculating a first bed density (RHO-1) of the fluidized bed (102) based on the second differential pressure (2DP)

and the height between the uppermost middle nozzle (UN2) and an uppermost lower nozzle (UN3);

(vi) calculating a second bed density (RHO-2) of the fluidized bed (102) based on the secondary second differential pressure (2DPB) and the height between lowermost middle nozzle (LN2) and a lowermost lower nozzle (LN3);

(vii) calculating a first bed height (L-1) by dividing the first differential pressure (1DP) by the first bed density (RHO-1);

(viii) calculating a second bed height (L-2) by dividing the secondary first differential pressure (1DPB) by the second bed density (RHO-2);

(ix) calculating an average bed height (L) by averaging the first bed height (L-1) and the second bed height (L-2);
in the second mode of operation:
(i) the pressurized gas (A00) is introduced into the vessel's interior (101), via the pluralities of upper, middle, and lower nozzles (N1, N1', N2, N2', N3, N3').

Figure 8:
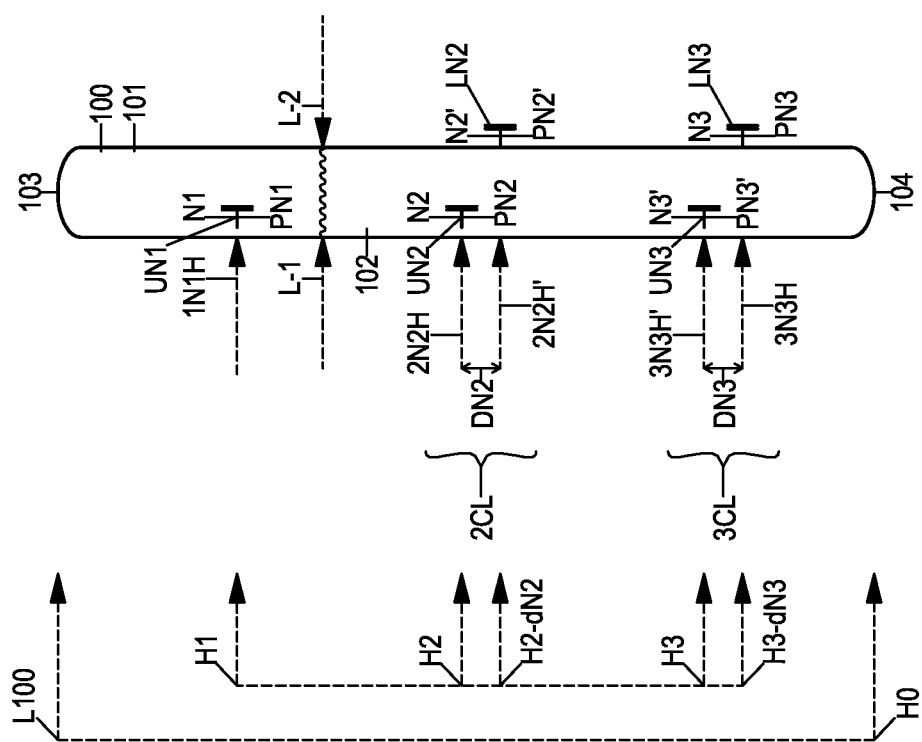
FIG. 8 depicts a non-limiting embodiment of FIG. 7 however includes only one upper nozzle (N1). In embodiments, for example shown in FIG. 1 there is only one upper nozzle (N1), one middle nozzle (N2), and one lower nozzle (N3). So therefore, the first differential pressure (1DP) is the difference in pressure between the upper nozzle (N1) and lower nozzle (N3) and the second differential pressure (2DP) is the difference in pressure between the middle nozzle (N2) and lower nozzle (N3).

In embodiments, the present disclosure describes that the vessel (100) has a plurality of lower nozzles (N3, N3') close to the bottom (104), a plurality of upper nozzles (N1, N1') close to the top (103), and a plurality of middle nozzles (N2, N2') positioned between the upper and lower nozzles (N1, N1', N3, N3'), both upper nozzles (N1, N1') are located at the same upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), the fluidized bed (102) having a bed height (L) that is between the upper nozzles (N1, N1') and uppermost middle nozzle (UN2); in the first mode of operation:

(i) obtaining a first differential pressure (1DP) that is representative of the difference in pressure between the first upper nozzle (N1) and a lowermost lower nozzle (LN3);

(ii) obtaining a secondary first differential pressure (1DPB) is representative of the difference in pressure between the second upper nozzle (N1') and a lowermost lower nozzle (LN3);

(iii) obtaining a second differential pressure (2DP) that is representative of the difference in pressure between an uppermost middle nozzle (UN2) and a lowermost lower nozzle (LN3);

(iv) obtaining a secondary second differential pressure (2DPB) that is representative of the difference in pressure between a lowermost middle nozzle (LN2) and an uppermost lower nozzle (UN3);

(v) calculating a first bed density (RHO-1) of the fluidized bed (102) based on the second differential pressure (2DP) and the height between the uppermost middle nozzle (UN2) and a lowermost lower nozzle (LN3);

(vi) calculating a second bed density (RHO-2) of the fluidized bed (102) based on the secondary second differential pressure (2DPB) and the height between lowermost middle nozzle (LN2) and an uppermost lower nozzle (UN3);

(vii) calculating a first bed height (L-1) by dividing the first differential pressure (1DP) by the first bed density (RHO-1);

(viii) calculating a second bed height (L-2) by dividing the secondary first differential pressure (1DPB) by the second bed density (RHO-2);

(ix) calculating an average bed height (L) by averaging the first bed height (L-1) and the second bed height (L-2);
in the second mode of operation:
(i) the pressurized gas (A00) is introduced into the vessel's interior (101), via the pluralities of upper, middle, and lower nozzles (N1, N1', N2, N2', N3, N3').
FIG. 8

FIG. 8 depicts a non-limiting embodiment of FIG. 7 however includes only one upper nozzle (N1). In embodiments, for example shown in FIG. 1 there is only one upper nozzle (N1), one middle nozzle (N2), and one lower nozzle (N3). So therefore, the first differential pressure (IDP) is the difference in pressure between the upper nozzle (N1) and lower nozzle (N3) and the second differential pressure (2DP) is the difference in pressure between the middle nozzle (N2) and lower nozzle (N3).

FIG. 8 shows the first lower nozzle (N3) located at a first lower nozzle height (3N3H), and the second lower nozzle (N3') located at a second lower nozzle height (3N3H'). The first lower nozzle height (3N3H) is positioned lower on the vessel (100) than the second lower nozzle height (3N3H'). In the embodiment shown in FIG. 8, the first lower nozzle (N3) serves as the lowermost lower nozzle (LN3) and the second lower nozzle (N3') serves as the uppermost lower nozzle (UN3). The lower vertical extent (DN3) is the difference in height between the first lower nozzle (N3) at the first lower nozzle height (3N3H) and the second lower nozzle (N3') at the second lower nozzle height (3N3H'). Or the lower vertical extent (DN3) is the difference in height between the uppermost lower nozzle (UN3) and the lowermost lower nozzle (LN3). Here, the first lower nozzle (N3) has a first lower pressure (PN3), and the second lower nozzle (N3') has a second lower pressure (PN3'). Since the first lower nozzle (N3) is positioned lower on the vessel (100) than the second lower nozzle (N3'), the first lower nozzle (N3) has a first lower pressure (PN3) that is greater than second lower nozzle (N3').

In embodiments, the present disclosure describes that the vessel (100) has one upper nozzle (N1), a plurality of middle nozzles (N2, N2') and a plurality of lower nozzles (N3, N3') that are organized into two vertically spaced-apart clusters (2CL, 3CL) positioned below the upper nozzle (N1), a middle cluster (2CL) including a plurality of middle nozzles (N2, N2'), and a lower cluster (3CL) including the plurality of lower nozzles (N3, N3'), the lower cluster (3CL) is close to the bottom (104), the upper nozzle (N1) is close to the top (103), and the middle cluster (2CL) positioned between the upper nozzle (N1) and lower cluster (3CL), the fluidized bed (102) having a bed height (L) that is between the upper nozzle (N1) and the middle cluster (2CL);
in the first mode of operation:
(i) obtaining a first differential pressure (1DP) that the difference in pressure between the upper nozzle (N1) and a lower nozzle (N3, N3') of the third cluster (3CL);

(ii) obtaining a second differential pressure (2DP) that is representative of an average difference in pressures between a second cluster (2CL) and the third cluster (3CL);

(iii) calculating a bed density (RHO) of the fluidized bed (102) based on the second differential pressure (2DP) and at least one height difference between at least one middle nozzle (N2, N2') and at least one the lower nozzle (N3, N3');

(iv) calculating a bed height (L) by dividing the first differential pressure (1DP) by the calculated bed density (RHO);

in the second mode of operation:

(i) the pressurized gas (A00) is introduced into the vessel's interior (100), via the upper nozzle and pluralities of middle and lower (N1, N2, N2', N3, N3').

In embodiments, the present disclosure describes that the vessel (100) has a plurality of lower nozzles (N3, N3') close to the bottom (104), one upper nozzle (N1) close to the top (103), and a plurality of middle nozzles (N2, N2') positioned between the upper nozzle (N1) and the plurality of lower nozzles (N3, N3'), the fluidized bed (102) having a bed height (L) that is between the upper nozzle (N1) the uppermost of the middle nozzles (N2, N2');

in the first mode of operation:

(i) the first differential pressure (1DP) is representative of the difference in pressure between a first pressure at the upper nozzle (N1) and a third pressure at the lowermost lower nozzle (N3, N3');

(ii) the second differential pressure (2DP) is representative of an average difference in pressures between the first middle pressure (PN2) and second middle pressure (PN2') at the plurality of middle nozzles (N2, N2') and the first lower pressure (PN3) and second lower pressure (PN3') at the plurality of lower nozzles (N3, N3');

(iii) calculating a bed density (RHO) of the fluidized bed (102) based on the second differential pressure (2DP) and at least one height difference between the plurality of middle nozzles (N2, N2') and the plurality of lower nozzles (N3, N3');

(iv) calculating a bed height (L) by dividing the first differential pressure (1DP) by the calculated bed density (RHO);

in the second mode of operation:

(i) the pressurized gas (A00) is introduced into the vessel's interior (101), via the upper nozzle and pluralities of middle and lower (N1, N2, N2', N3, N3').

In embodiments, the present disclosure describes that the vessel (100) has a plurality of lower nozzles (N3, N3') close to the bottom (104), one upper nozzle (N1) close to the top (103), and a plurality of middle nozzles (N2, N2') positioned between the upper nozzle (N1) and lower nozzles (N3, N3'), the upper nozzle (N1) is located an upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), the fluidized bed (102) having a bed height (L) that is between the upper nozzle (N1) and uppermost middle nozzle (UN2);

in the first mode of operation:

(i) obtaining a first differential pressure (1DP) that is representative of the difference in pressure between the upper nozzle (N1) and a lowermost lower nozzle (LN3);

(ii) obtaining a second differential pressure (2DP) that is representative of the difference in pressure between an uppermost middle nozzle (UN2) and an uppermost lower nozzle (UN3);

(iii) obtaining a secondary second differential pressure (2DPB) that is representative of the difference in pressure between a lowermost middle nozzle (LN2) and a lowermost lower nozzle (LN3);

(iv) calculating a first bed density (RHO-1) of the fluidized bed (102) based on the second differential pressure (2DP) and the height between the uppermost middle nozzle (UN2) and an uppermost lower nozzle (UN3);

(v) calculating a second bed density (RHO-2) of the fluidized bed (102) based on the secondary second differential pressure (2DPB) and the height between lowermost middle nozzle (LN2) and a lowermost lower nozzle (LN3);

(vi) calculating an average bed density (RHO) by averaging the first bed density (RHO-1) and the second bed density (RHO-2);

(vii) calculating a bed height (L) by dividing the first differential pressure (1DP) by the average bed density (RHO);

in the second mode of operation:

(i) the pressurized gas is (A00) introduced into the vessel's interior (101), via the upper nozzle (N1) and pluralities of middle and lower nozzles (N2, N2', N3, N3').

In embodiments, the present disclosure describes that the vessel (100) has a plurality of lower nozzles (N3, N3') close to the bottom (104), one upper nozzle (N1) close to the top (103), and a plurality of middle nozzles (N2, N2') positioned between the upper nozzle (N1) and lower nozzles (N3, N3'), the upper nozzle (N1) is located an upper nozzle height (H1), the uppermost middle nozzle (UN2) is located at first middle nozzle height (2N2H) above the lowermost middle nozzle (LN2), the lowermost middle nozzle (LN2) is located at a second middle nozzle height (2N2H') below the uppermost middle nozzle (UN2), the lowermost lower nozzle (LN3) is located at a first lower nozzle height (3N3H) below the uppermost lower nozzle (UN3), the uppermost lower nozzle (UN3) is located at a second lower nozzle height (3N3H') above the lowermost lower nozzle (LN3), the fluidized bed (102) having a bed height (L) that is between the upper nozzle (N1) and uppermost middle nozzle (UN2);

in the first mode of operation:

(i) obtaining a first differential pressure (1DP) that is representative of the difference in pressure between the upper nozzle (N1) and a lowermost lower nozzle (LN3);

(ii) obtaining a second differential pressure (2DP) that is representative of the difference in pressure between an uppermost middle nozzle (UN2) and a lowermost lower nozzle (LN3);

(iii) obtaining a secondary second differential pressure (2DPB) that is representative of the difference in pressure between a lowermost middle nozzle (LN2) and an uppermost lower nozzle (UN3);

(iv) calculating a first bed density (RHO-1) of the fluidized bed (102) based on the second differential pressure (2DP) and the height between the uppermost middle nozzle (UN2) and a lowermost lower nozzle (LN3);

(v) calculating a second bed density (RHO-2) of the fluidized bed (102) based on the secondary second differential pressure (2DPB) and the height between lowermost middle nozzle (LN2) and an uppermost lower nozzle (UN3);

(vi) calculating an average bed density (RHO) by averaging the first bed density (RHO-1) and the second bed density (RHO-2);

(vii) calculating a bed height (L) by dividing the first differential pressure (1DP) by the average bed density (RHO);

in the second mode of operation:

(i) the pressurized gas is (A00) introduced into the vessel's interior (101), via the upper nozzle (N1) and pluralities of middle and lower nozzles (N2, N2', N3, N3').

FIG. 9

Figure 9:
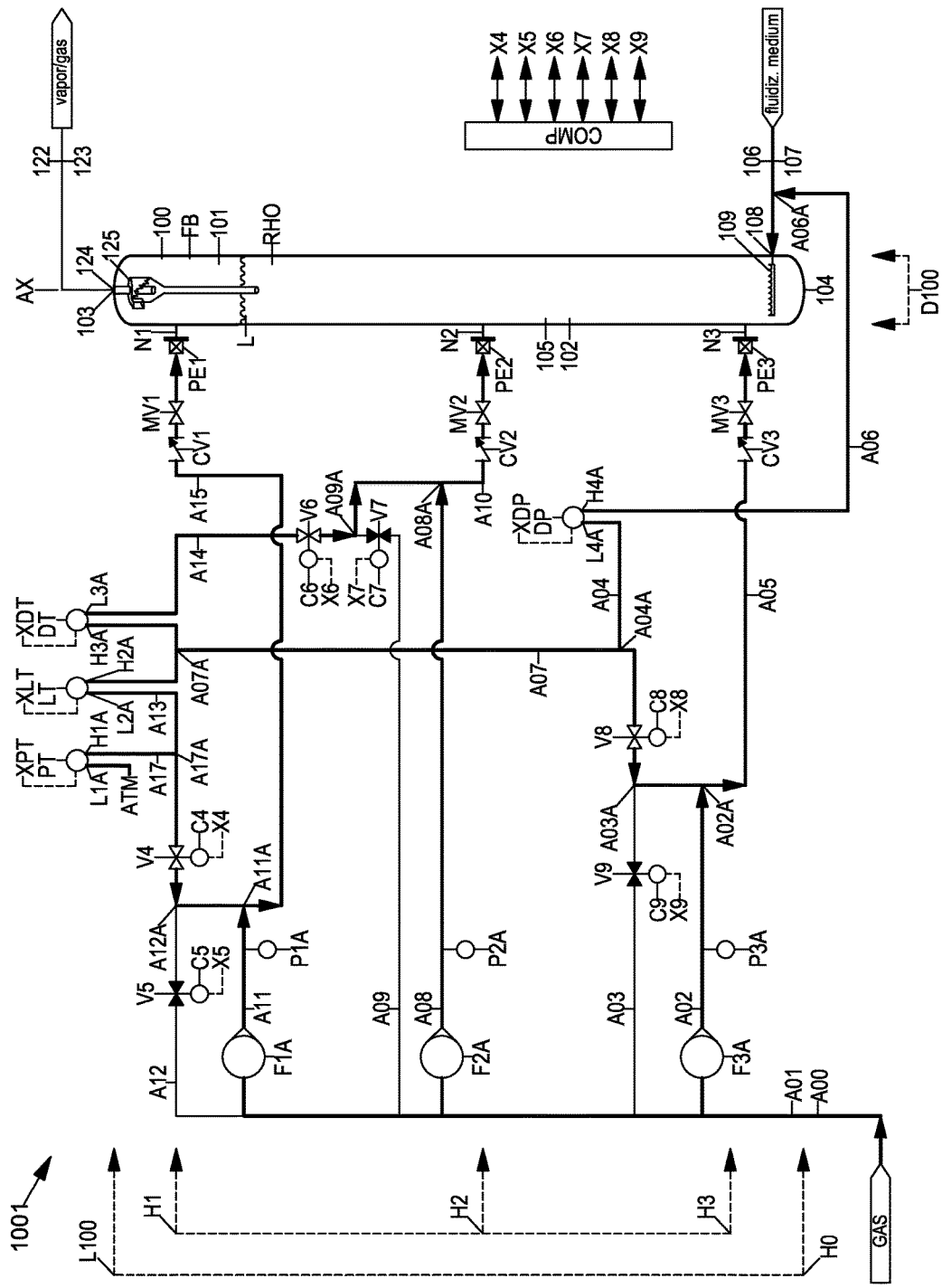
FIG. 9 depicts a non-limiting embodiment of an alternate automated level and density measurement system (1001) in a third mode of normal operation (Mode 3) that is a variation of the system (1000) of FIG. 1 and includes three pluralities of two separate valves to achieve the function of the plurality of valves of FIG. 1.

FIG. 9 depicts a non-limiting embodiment of an alternate automated level and density measurement system (1001) in a third mode of normal operation (Mode 3) that is a variation of the system (1000) of FIG. 1 and includes three pluralities of two separate valves to achieve the function of the plurality of valves of FIG. 1.

The alternate automated level and density measurement system (1001) includes: an upper instrument valve (V4), an upper purge valve (V5), a middle instrument valve (V6), a middle purge valve (V7), a lower instrument valve (V8), and a lower purge valve (V9).

The upper instrument valve (V4) is positioned on the LT upper nozzle conduit (A13). The LT upper nozzle conduit (A13) is connected to the upper nozzle conduit (A15) at the upper purge connection (A12A). The upper instrument valve (V4) is equipped with a controller (C4) that sends a signal (X4) to and from a computer (COMP). The signal (X4) from the computer (COMP) instructs whether to open or close the upper instrument valve (V4).

The upper purge valve (V5) is installed on the upper high-flow gas conduit (A12). The upper high-flow gas conduit (A12) is connected at one end to the purge gas supply header (A01) and at another end to the upper nozzle conduit (A15) via an upper purge connection (A12A). The upper purge valve (V5) is equipped with a controller (C5) that sends a signal (X5) to and from a computer (COMP). The signal (X5) from the computer (COMP) instructs whether to open or close the upper purge valve (V5).

The middle instrument valve (V6) is positioned on the DT middle nozzle conduit (A14). The DT middle nozzle conduit (A14) is connected to the middle nozzle conduit (A10) at the middle purge connection (A09A). The middle instrument valve (V6) is equipped with a controller (C6) that sends a signal (X6) to and from a computer (COMP). The signal (X6) from the computer (COMP) instructs whether to open or close the middle instrument valve (V6).

The middle purge valve (V7) is installed on the middle high-flow gas conduit (A09). The middle high-flow gas conduit (A09) is connected at one end to the purge gas supply header (A01) and at another end to the middle nozzle conduit (A10) via a middle purge connection (A09A). The middle purge valve (V7) is equipped with a controller (C7) that sends a signal (X7) to and from a computer (COMP). The signal (X7) from the computer (COMP) instructs whether to open or close the middle purge valve (V7).

The lower instrument valve (V8) is positioned on the LT/DT lower nozzle conduit (A07). The LT/DT lower nozzle conduit (A07) is connected to the lower nozzle conduit (A05) at the lower purge connection (A03A). The lower instrument valve (V8) is equipped with a controller (C8) that sends a signal (X8) to and from a computer (COMP). The signal (X8) from the computer (COMP) instructs whether to open or close the lower instrument valve (V8).

The lower purge valve (V9) is installed on the lower high-flow gas conduit (A03). The lower high-flow gas conduit (A03) is connected at one end to the purge gas supply header (A01) and at another end to the lower nozzle conduit (A05) via a lower purge connection (A03A). The lower purge valve (V9) is equipped with a controller (C9) that sends a signal (X9) to and from a computer (COMP). The signal (X9) from the computer (COMP) instructs whether to open or close the lower purge valve (V9).

The alternate system (1001) of FIG. 9 is configured to operate in a third mode of normal operation (Mode 3) in which: the upper instrument valve (V4) is open, the upper purge valve (V5) is closed, the middle instrument valve (V6) is open, the middle purge valve (V7) is closed, the lower instrument valve (V8) is open, and the lower purge valve (V9) is closed. This is depicted in FIG. 9 wherein the valves V5, V7, V9 are shown as darkened-in which indicate the closed position. Further, relatively thicker line weights are attributed to FIG. 9 indicate the flow-path that is available due to the specific positioning of the valving of embodiment of Mode 3.

FIG. 10

Figure 10:
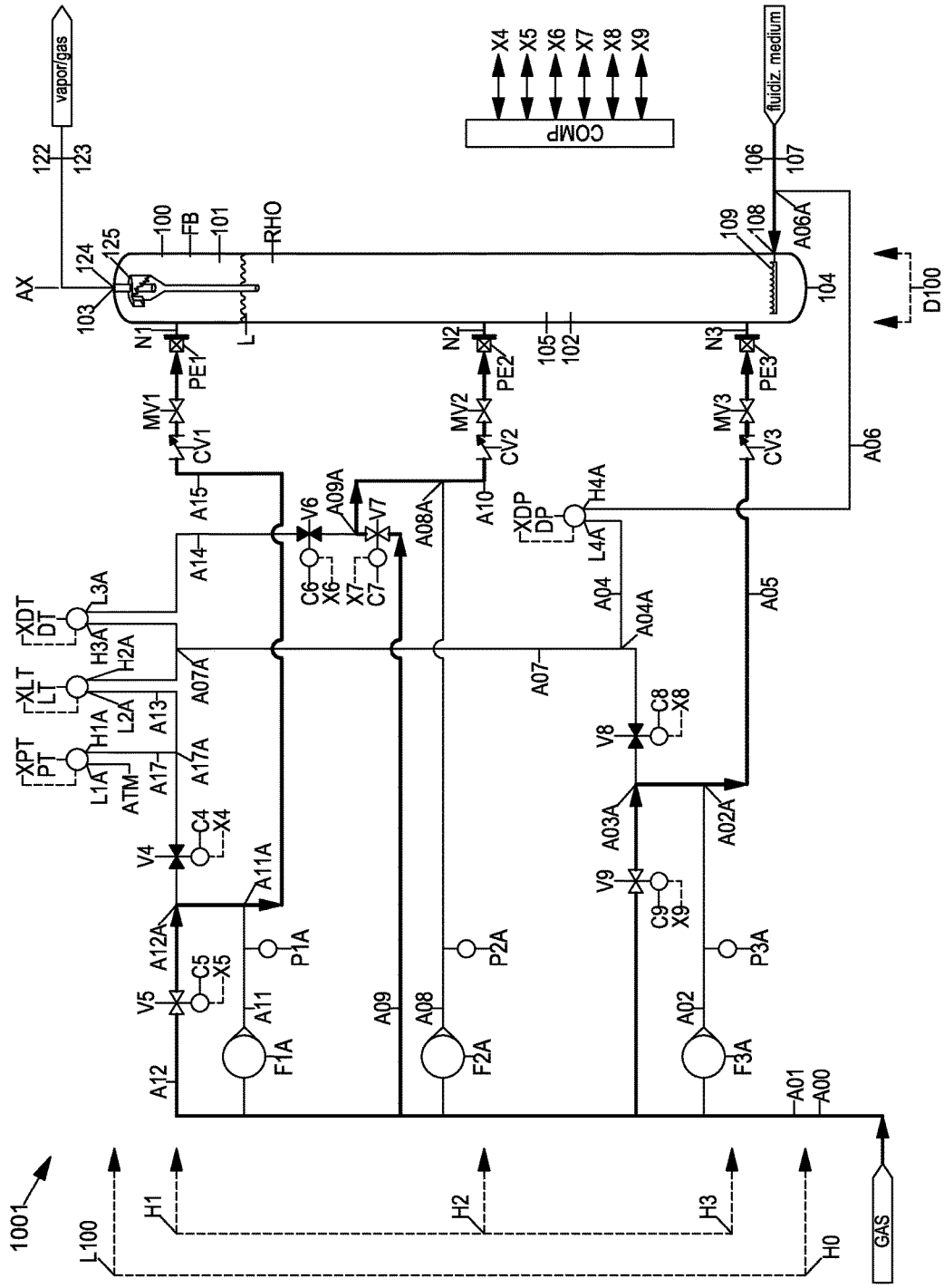
FIG. 10 depicts a non-limiting embodiment of an alternate automated level and density measurement system (1001) in a fourth mode of normal operation (Mode 4) that is a variation of the system (1001) of FIG. 9.

FIG. 10 depicts a non-limiting embodiment of an alternate automated level and density measurement system (1001) in a fourth mode of normal operation (Mode 4) that is a variation of the system (1001) of FIG. 9.

The alternate system (1001) of FIG. 10 is configured to operate in a fourth mode of purge operation (Mode 4) in which: the upper instrument valve (V4) is closed, the upper purge valve (V5) is open, the middle instrument valve (V6) is closed, the middle purge valve (V7) is open, the lower instrument valve (V8) is closed, and the lower purge valve (V9) is open. This is depicted in FIG. 9 wherein the valves V4, V6, V8 are shown as darkened-in which indicate the closed position. Further, relatively thicker line weights are attributed to FIG. 10 to indicate the flow-path that is available due to the specific positioning of the valving of embodiment of Mode 4.

FIG. 11

FIG. 11 discloses the valve states for automated controller operation of the non-limiting embodiments shown in FIGS. 9 and 10.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific systems and methods of an automated fluidized bed level and density measurement system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

LISTING OF REFERENCE NUMERALS first automated level and density measurement system (1000)
second automated level and density measurement system (1000')
alternate automated level and density measurement system (1001)
vessel (100)
interior (101)
longitudinal axis (AX)
diameter (D100)
vessel height (L100)
fluidized bed (102)
top (103)
bottom (104)
bed material (105)
fluidization medium (106)
fluidization medium supply conduit (107)
fluidization medium input (108)
fluidization distribution grid (109)
vapor/gas (122)
vapor/gas discharge conduit (123)
vapor/gas output (124)
internal cyclone (125)
freeboard zone (FB)
bed height (L)
first bed height (L-1)
second bed height (L-2)
upper nozzle valve (V1)
upper instrument port (V1A)
upper purge port (V1B)
upper common port (V1C)
controller (C1)
signal (X1)
middle nozzle valve (V2)
middle instrument port (V2A)
middle purge port (V2B)
middle common port (V2C)
controller (C2)
signal (X2)
lower nozzle valve (V3)
lower instrument port (V3A)
lower purge port (V3B)
lower common port (V3C)
controller (C3)
signal (X3)
upper instrument valve (V4)
controller (C4)
signal (X4)
upper purge valve (V5)
controller (C5)
signal (X5)
middle instrument valve (V6)
controller (C6)
signal (X6)
middle purge valve (V7)
controller (C7)
signal (X7)
lower instrument valve (V8)
controller (C8)
signal (X8)
lower purge valve (V9)

controller (C9)
signal (X9)
atmospheric pressure (ATM)
freeboard pressure sensor (PT)
differential pressure signal (XPT)
high-pressure port (H1A)
low-pressure port (L1A)
level sensor (LT)
differential pressure signal (XLT)
high-pressure port (H2A)
low-pressure port (L2A)
density sensor (DT)
differential pressure signal (XDT)
high-pressure port (H3A)
low-pressure port (L3A)
fluidization grid differential pressure sensor (DP)
signal (XDP)
high-pressure port (H4A)
low-pressure port (L4A)
pressurized gas (A00)
purge gas supply header (A01)
lower low-flow gas conduit (A02)
lower connection (A02A)
lower high-flow gas conduit (A03)
lower purge connection (A03A)
DP lower nozzle conduit (A04)
connection (A04A)
lower nozzle conduit (A05)
DP fluidization grid inlet conduit (A06)
fluidization medium supply conduit connection (A06A)
LT/DT lower nozzle conduit (A07)
first connection (A07A)
middle low-flow gas conduit (A08)
middle connection (A08A)
middle high-flow gas conduit (A09)
middle purge connection (A09A)
middle nozzle conduit (A10)
upper low-flow gas conduit (A11)
upper connection (A11A)
upper high-flow gas conduit (A12)
upper purge connection (A12A)
LT upper nozzle conduit (A13)
LT connection (A13A)
DT middle nozzle conduit (A14)
upper nozzle conduit (A15)
PT upper nozzle conduit (A17)
PT connection (A17A)
first upper nozzle (N1)
upper check valve (CV1)
upper manual valve (MV1)
upper porous element (PE1)
first middle nozzle (N2)
middle check valve (CV2)
middle manual valve (MV2)
middle porous element (PE2)
first lower nozzle (N3)
lower check valve (CV3)
lower manual valve (MV3)
lower porous element (PE3)
upper flow sensor (F1A)
upper pressure sensor (P1A)
middle flow sensor (F2A)
middle pressure sensor (P2A)
lower flow sensor (F3A)
lower pressure sensor (P3A)
calculated bed density (RHO)
first bed density (RHO-1)

second bed density (RHO-2)
base height (H0)
upper nozzle height (H1)
middle nozzle height (H2)
lower nozzle height (H3)
computer (COMP)
upper nozzle valve (V1')
upper instrument port (V1A')
upper purge port (V1B')
upper common port (V1C')
middle nozzle valve (V2')
middle instrument port (V2A')
middle purge port (V2B')
middle common port (V2C')
lower nozzle valve (V3')
lower instrument port (V3A')
lower purge port (V3B')
lower common port (V3C')
level sensor (LT')
differential pressure signal (XLT')
high-pressure port (H2A')
low-pressure port (L2A')
density sensor (DT')
differential pressure signal (XDT')
high-pressure port (H3A')
low-pressure port (L3A')
lower nozzle low flow purge gas supply conduit (A02')
lower connection (A02A')
lower nozzle high flow purge gas supply conduit (A03')
lower nozzle conduit (A05')
LT/DT lower nozzle conduit (A07')
first connection (A07A')
middle nozzle low flow purge gas supply conduit (A08')
middle connection (A08A')
middle nozzle high flow purge gas supply conduit (A09')
middle nozzle conduit (A10')
upper nozzle low flow purge gas supply conduit (A11')
upper connection (A11A')
upper nozzle high flow purge gas supply conduit (A12')
LT upper nozzle conduit (A13')
DT middle nozzle conduit (A14')
upper nozzle conduit (A15')
second upper nozzle (N1')
upper check valve (CV1')
upper manual valve (MV1')
upper porous element (PE1')
second middle nozzle (N2')
middle check valve (CV2')
middle manual valve (MV2')
middle porous element (PE2')
second lower nozzle (N3')
lower check valve (CV3')
lower manual valve (MV3')
lower porous element (PE3')
upper nozzle flow sensor (F1A')
upper nozzle pressure sensor (P1A')
middle nozzle flow sensor (F2A')
middle nozzle pressure sensor (P2A')
lower nozzle flow sensor (F3A')
lower nozzle pressure sensor (P3A')
connector (Z1)
connection (Z2)
first differential pressure (1DP)
second differential pressure (2DP)
secondary first differential pressure (1DPB)
secondary second differential pressure (2DPB)
upper cluster (1CL)

first upper nozzle height (1N1H)
second upper nozzle height (1N1H')
upper vertical extent (DN1)
uppermost upper nozzle (UN1)
lowermost upper nozzle (LN1)
first upper pressure (PN1)
second upper pressure (PN1')
middle cluster (2CL)
first middle nozzle height (2N2H)
second middle nozzle height (2N2H')
middle vertical extent (DN2)
uppermost middle nozzle (UN2)
lowermost middle nozzle (LN2)
first middle pressure (PN2)
second middle pressure (PN2')
lower cluster (3CL)
first lower nozzle height (3N3H)
second lower nozzle height (3N3H')
lower vertical extent (DN3)
uppermost lower nozzle (UN3)
lowermost lower nozzle (LN3)
first lower pressure (PN3)

What is claimed is:

1. A method for determining bed height and bed density of a fluidized bed while mitigating blockage of one or more nozzles used to determine said bed height and said bed density, the fluidized bed being in a vessel having an interior, a top, a bottom, and a longitudinal axis extending along a vertical height direction of the vessel, the vessel further having a lower nozzle connected to a lower nozzle conduit, an upper nozzle connected to an upper nozzle conduit, and a middle nozzle positioned between the upper and lower nozzles in a vertical height direction and connected to a middle nozzle conduit, said fluidized bed having a bed height that is between the upper nozzle and middle nozzle, the method comprising:
   (a) in a first mode of operation:
      (i) using one or more pressure sensors, obtaining a first differential pressure representative of a difference between a first pressure in the upper nozzle conduit and a third pressure in the lower nozzle conduit;
      (ii) using one or more pressure sensors, obtaining a second differential pressure representative of a difference between a second pressure in the middle nozzle conduit and the third pressure in the lower nozzle conduit;
      (iii) calculating a bed density of the fluidized bed based on the second differential pressure and a height difference between the middle nozzle and the lower nozzle;
      (iv) calculating the bed height based on the first differential pressure and said calculated bed density; and
   (b) in a second mode of operation:
      (i) using one or more valves, purging said upper, lower, and middle nozzles by introducing a pressurized gas into the vessel's interior, via:
         the upper nozzle conduit and the upper nozzle;
         the middle nozzle conduit and the middle nozzle; and
         the lower nozzle conduit and the lower nozzle; to
      thereby mitigate blockage of the nozzles used in determining height and bed density of the fluidized bed.

2. The method according to claim 1, comprising:
   passing said pressurized gas through first, second and third porous elements, prior to introducing said pressurized gas into the vessel's interior to purge said upper, lower and middle nozzles.

3. The method according to claim 2, wherein each porous element has openings ranging from 0.25 microns to 100 microns.

4. The method according to claim 1, further comprising providing:
   (i) an upper nozzle valve including: an upper instrument port in fluid communication with a level sensor configured to measure a first pressure in the upper nozzle conduit, an upper purge port in fluid communication with a supply of pressurized gas, and an upper common port connected to the upper nozzle via the upper nozzle conduit;
   (ii) a middle nozzle valve including: a middle instrument port in fluid communication with a density sensor configured to measure a second pressure in the middle nozzle conduit, a middle purge port in fluid communication with a supply of pressurized gas, and a middle common port connected to the middle nozzle via the middle nozzle conduit; and
   (iii) a lower nozzle valve including: a lower instrument port in fluid communication with both the level sensor and density sensor and configured to measure a third pressure in the lower nozzle conduit, a lower purge port in fluid communication with a supply of pressurized gas, and a lower common port connected to the lower nozzle via a lower nozzle conduit;
   wherein:
   (a) in the first mode of operation:
      (a1) the level sensor measures the first pressure in the upper nozzle conduit through the upper instrument port and the upper common port of the upper nozzle valve,
      (a2) the density sensor measures the second pressure in the middle nozzle conduit through the middle instrument port and the middle common port of the middle nozzle valve, and
      (a3) the level sensor and density sensor measure the third pressure in the lower nozzle conduit through the lower instrument port and the lower common port of the lower nozzle valve; and
   (b) in the second mode of operation:
      (b1) purging the upper nozzle by passing pressurized gas through the upper purge port to the upper common port of the upper nozzle valve and into the upper nozzle conduit and the upper nozzle,
      (b2) purging the middle nozzle by passing pressurized gas through the middle purge port to the middle common port of the middle nozzle valve and into the middle nozzle conduit and the middle nozzle, and
      (b3) purging the lower nozzle by passing pressurized gas through the lower purge port to the lower common port of the lower nozzle valve and into the lower nozzle conduit and the lower nozzle.

5. A method for determining bed height and bed density of a fluidized bed while mitigating blockage of one or more nozzles used to determine said bed height and said bed density, the fluidized bed being in a vessel having an interior, a top, a bottom, and a longitudinal axis extending along a vertical height direction of the vessel, the vessel further having one or more upper nozzles each connected to a corresponding upper nozzle conduit, one or more lower nozzles each connected to a corresponding lower nozzle conduit, and one or more middle nozzles each connected to a corresponding middle nozzle conduit, the one or more middle nozzle conduits positioned between said one or more upper nozzles and said one or more lower nozzles in said vertical height direction, said fluidized bed having a bed height that is between the one or more upper nozzles and the one or more middle nozzles, the method comprising:

(a) in a measurement mode:
(i) using one or more pressure sensors, obtaining a first differential pressure reflective of a difference between: a first pressure corresponding to the one or more upper nozzle conduits and a third pressure corresponding to the one or more lower nozzle conduits;
(ii) using one or more pressure sensors, obtaining a second differential pressure reflective of a difference between: a second pressure corresponding to the one or more middle nozzle conduits and a fourth pressure which corresponds to the one or more lower nozzle conduits;
(iii) calculating a bed density of the fluidized bed based on the second differential pressure and a differential height reflective of a difference between: a middle height associated with the one or more middle nozzles and a lower height associated with the one or more lower nozzles;
(iv) calculating the bed height based on the first differential pressure and said calculated bed density; and (b) in a purge mode:
(i) using one or more valves, purging at least some of said nozzles by introducing pressurized gas into the vessel's interior, first via the nozzle conduits corresponding to the nozzles being purged and then via the nozzles being purged themselves, to thereby mitigate blockage of the nozzles used in determining height and bed density of the fluidized bed.

6. The method according to claim 5, comprising, in said purge mode:
passing said pressurized gas through a porous element associated with each nozzle being purged.

7. The method according to claim 6, wherein each porous element has openings ranging from 0.25 microns to 100 microns.

8. The method according to claim 5, further comprising:
(a) in the measurement mode:
(a1) measuring pressure in one of the one or more upper nozzle conduits through a common first port and a second port of an upper three-port valve, the common first port of the upper three-port valve being in fluid communication with said one of the one or more upper nozzle conduits:
(a2) measuring pressure in one of the one or more middle nozzle conduits through a common first port and a second port of a middle three-port valve, the common first port of the middle three-port valve being in fluid communication with said one of the one or more middle nozzle conduits: and
(a3) measuring pressure in one of the one or more lower nozzle conduits through a first port and a common second port of a lower three-port valve, the common second port of the lower three-port valve being in fluid communication with said one of the one or more lower nozzle conduits; and
(b) in the purge mode:
(b1) purging the upper nozzle connected to said one of the one or more upper nozzle conduits through a third port and the common first port of the upper three-port valve;
(b2) purging the middle nozzle connected to said one of the one or more middle nozzle conduits through a third port and the common first port of the middle three-port valve; and
(b3) purging the lower nozzle connected to said one of the one or more lower nozzle conduits through a third port and the common first port of the lower three-port valve.

9. The method according to claim 5, comprising, in the purge mode:
purging one or more upper nozzles and one or more lower nozzles, while suspending obtaining the first differential pressure; and
purging one or more middle nozzles and one or more lower nozzles, while suspending obtaining the second differential pressure.

10. The method according to claim 5, wherein:
the vessel further comprises:
a fluidization distribution grid positioned within the vessel's interior,
a fluidization medium input connected to a fluidization medium supply conduit for supplying a fluidization medium to the fluidization distribution grid, and
a fluidization grid differential pressure sensor configured to measure a pressure difference between the fluidization medium supply conduit, and at the one or more lower conduits; and
the measurement mode further comprises:
measuring pressure across the fluidization distribution grid with the fluidization grid differential pressure sensor.

11. The method according to claim 5, wherein:
the third pressure and fourth pressure both correspond to the same one or more lower nozzle conduits.

12. The method according to claim 5, wherein:
the vessel has a plurality of upper nozzles belonging to an upper cluster, a plurality of lower nozzles belonging to a lower cluster, and a plurality of middle nozzles belonging to a middle cluster, the clusters being vertically spaced apart from one another in the vertical height direction, with the middle cluster positioned between the upper and lower clusters, said fluidized bed having a bed height that is between the upper cluster and the middle cluster;
the first pressure is an average pressure of the conduits belonging to the upper cluster;
the second pressure is an average pressure of the conduits belonging to the middle cluster;
the third pressure is an average pressure of the conduits belonging to the lower cluster;
the fourth pressure also is an average pressure of the conduits belonging to the lower cluster;
the middle height is an average height of nozzles belonging to the middle cluster; and
the lower height is an average height of nozzles belonging to the lower cluster.

13. The method according to claim 5, wherein:
the vessel has a single upper nozzle, a plurality of lower nozzles belonging to a lower nozzle cluster, and a plurality of middle nozzles belonging to a middle cluster, the upper nozzle, the middle cluster and the lower cluster being vertically spaced apart from one another in the vertical height direction, with the middle cluster positioned between the upper nozzle and the lower cluster, said fluidized bed having a bed height that is between the upper nozzle and the middle cluster;

the first pressure is a pressure of the conduit corresponding to the single upper nozzle;

the second pressure is an average pressure of the conduits belonging to the middle cluster;

the third pressure is an average pressure of the conduits belonging to the lower cluster;

the fourth pressure also is an average pressure of the conduits belonging to the lower cluster;

the second pressure is an average pressure of the conduits belonging to the middle cluster;

the middle height is an average height of nozzles belonging to the middle cluster; and the lower height is an average height of nozzles belonging to the lower cluster.

14. The method according to claim 5, wherein:

the vessel has a single upper nozzle, a plurality of lower nozzles belonging to a lower nozzle cluster, and a plurality of middle nozzles belonging to a middle cluster, the upper nozzle, the middle cluster and the lower cluster being vertically spaced apart from one another in the vertical height direction, with the middle cluster positioned between the upper nozzle and the lower cluster, said fluidized bed having a bed height that is between the upper nozzle and the middle cluster;

the first pressure is a pressure of the conduit corresponding to the single upper nozzle;

the second pressure is an average pressure of the conduits belonging to the middle cluster;

the third pressure corresponds to a lowermost one of a plurality of conduits belonging to the lower cluster;

the fourth pressure is an average pressure of the conduits belonging to the lower cluster;

the second pressure is an average pressure of the conduits belonging to the middle cluster;

the middle height is an average height of nozzles belonging to the middle cluster; and the lower height is an average height of nozzles belonging to the lower cluster.

15. The method according to claim 5, wherein:

the vessel includes:

first and second upper nozzles, first and second lower nozzles, and first and second middle nozzles, the middle nozzles positioned in the vertical height direction between the upper nozzles and the lower nozzles, and the fluidized bed has a bed height that is between the upper nozzles and the middle nozzles.

16. The method according to claim 15, comprising:

obtaining a first first differential pressure based on the first upper nozzle and the first lower nozzle;

obtaining a second first differential pressure based on the second upper nozzle and the second lower nozzle;

obtaining a first second differential pressure based on the first middle nozzle and the first lower nozzle;

obtaining a second second differential pressure based on the second middle nozzle and the second lower nozzle;

calculating a first bed density of the fluidized bed based on the first second differential pressure and a height difference between the first middle nozzle and the first lower nozzle;

calculating a second bed density of the fluidized bed based on the second second differential pressure and a height difference between the second middle nozzle and the second lower nozzle;

calculating a first bed height based on the first first differential pressure and the first bed density;

calculating a second bed height based on the second first differential pressure and the second bed density; and calculating an average bed height by averaging the first bed height and the second bed height.

17. The method according to claim 15, wherein:

the vessel has an uppermost middle nozzle, a lowermost middle nozzle, an uppermost lower nozzle and a lowermost lower nozzle, and the method comprises:

obtaining a first first differential pressure based on the first upper nozzle and the lowermost lower nozzle;

obtaining a second first differential pressure based on the second upper nozzle and the lowermost lower nozzle;

obtaining a first second differential pressure based on the uppermost middle nozzle and the uppermost lower nozzle;

obtaining a second second differential pressure based on the lowermost middle nozzle and the lowermost lower nozzle;

calculating a first bed density of the fluidized bed based on the first second differential pressure and a height difference between the uppermost middle nozzle and the uppermost lower nozzle;

calculating a second bed density of the fluidized bed based on the second second differential pressure and a height difference between the lowermost middle nozzle and the lowermost lower nozzle;

calculating a first bed height based on the first first differential pressure and the first bed density;

calculating a second bed height based on the second first differential pressure and the second bed density; and calculating an average bed height by averaging the first bed height and the second bed height.

18. The method according to claim 15, wherein:

the vessel has an uppermost middle nozzle, a lowermost middle nozzle, an uppermost lower nozzle and a lowermost lower nozzle, and the method comprises:

obtaining a first first differential pressure based on the first upper nozzle and the lowermost lower nozzle;

obtaining a second first differential pressure based on the second upper nozzle and the lowermost lower nozzle;

obtaining a first second differential pressure based on the uppermost middle nozzle and the lowermost lower nozzle;

obtaining a second second differential pressure based on the lowermost middle nozzle and the uppermost lower nozzle;

calculating a first bed density of the fluidized bed based on the first second differential pressure and a height difference between the uppermost middle nozzle and the lowermost lower nozzle;

calculating a second bed density of the fluidized bed based on the second second differential pressure and a height difference between the lowermost middle nozzle and the uppermost lower nozzle;

calculating a first bed height based on the first first differential pressure and the first bed density;

calculating a second bed height based on the second first differential pressure and the second bed density; and calculating an average bed height by averaging the first bed height and the second bed height.

19. The method according to claim 5, wherein:
the vessel includes:
- a single upper nozzle, first and second lower nozzles, and first and second middle nozzles,
- the middle nozzles positioned in the vertical height direction between the single upper nozzle and the lower nozzles, and
- the fluidized bed has a bed height that is between the upper nozzle and the middle nozzles.

20. The method according to claim 19, comprising:
obtaining the first differential pressure based on the single upper nozzle and the first lower nozzle;
obtaining a second first differential pressure based on the second upper nozzle and the second lower nozzle;
obtaining a first second differential pressure based on the first middle nozzle and the first lower nozzle;
obtaining a second second differential pressure based on the second middle nozzle and the second lower nozzle;
calculating a first bed density of the fluidized bed based on the first second differential pressure and a height difference between the first middle nozzle and the first lower nozzle;
calculating a second bed density of the fluidized bed based on the second second differential pressure and a height difference between the second middle nozzle and the second lower nozzle;
calculating an average bed density by averaging the first bed density and the second bed density; and
calculating the bed height based on the first differential pressure and the average bed density.

21. The method according to claim 19, wherein:
the vessel has an uppermost middle nozzle, a lowermost middle nozzle, an uppermost lower nozzle and a lowermost lower nozzle, and
the method comprises:
obtaining the first differential pressure based on the single upper nozzle and the lowermost lower nozzle;
obtaining a first second differential pressure based on the uppermost middle nozzle and the uppermost lower nozzle;
obtaining a second second differential pressure based on the lowermost middle nozzle and the lowermost lower nozzle;
calculating a first bed density of the fluidized bed based on the first second differential pressure and a height difference between the uppermost middle nozzle and the uppermost lower nozzle;
calculating a second bed density of the fluidized bed based on the second second differential pressure and a height difference between the lowermost middle nozzle and the lowermost lower nozzle;
calculating an average bed density by averaging the first bed density and the second bed density; and
calculating the bed height based on the first differential pressure and the average bed density.

22. The method according to claim 19, wherein:
the vessel has an uppermost middle nozzle, a lowermost middle nozzle, an uppermost lower nozzle and a lowermost lower nozzle, and
the method comprises:
obtaining the first differential pressure based on the single upper nozzle and the lowermost lower nozzle;
obtaining a first second differential pressure based on the uppermost middle nozzle and the lowermost lower nozzle;
obtaining a second second differential pressure based on the lowermost middle nozzle and the uppermost lower nozzle;
calculating a first bed density of the fluidized bed based on the first second differential pressure and a height difference between the uppermost middle nozzle and the lowermost lower nozzle;
calculating a second bed density of the fluidized bed based on the second second differential pressure and a height difference between the lowermost middle nozzle and the uppermost lower nozzle;
calculating an average bed density by averaging the first bed density and the second bed density; and
calculating the bed height based on the first differential pressure and the average bed density.

* * * * *